US012637612B2

(12) United States Patent
Liotta et al.

(10) Patent No.: US 12,637,612 B2
(45) Date of Patent: May 26, 2026

(54) FLUORESCENT OPIOID BINDING COMPOUND AND USES THEREOF

(71) Applicant: GEORGE MASON UNIVERSITY, Fairfax, VA (US)

(72) Inventors: Lance Allen Liotta, Fairfax, VA (US); Yali Kong, Fairfax, VA (US); Alessandra Kunkel Luchini, Fairfax, VA (US); Amanda Haymond Still, Fairfax, VA (US); Marissa Howard, Fairfax, VA (US); Ali Andalibi, Fairfax, VA (US)

(73) Assignee: GEORGE MASON UNIVERSITY

( * ) Notice: Subject to any disclaimer, the term of this patent is extended or adjusted under 35 U.S.C. 154(b) by 249 days.

(21) Appl. No.: 18/366,217

(22) Filed: Aug. 7, 2023

(65) Prior Publication Data

US 2024/0141226 A1 May 2, 2024

Related U.S. Application Data

(60) Provisional application No. 63/413,737, filed on Oct. 6, 2022.

(51) Int. Cl.
*C09K 9/02* (2006.01)
*G01N 21/78* (2006.01)

(52) U.S. Cl.
CPC ........ *C09K 9/02* (2013.01); *C09K 2211/1088* (2013.01)

(58) Field of Classification Search
CPC ... C09K 9/02; C09K 2211/1088; G01N 21/78
See application file for complete search history.

(56) References Cited

U.S. PATENT DOCUMENTS

| | | | | |
|---|---|---|---|---|
| 3,627,690 A * | 12/1971 | Casella | G03C 1/685 | 252/586 |
| 5,458,814 A * | 10/1995 | Kumar | C07D 311/92 | 548/200 |
| 2014/0242722 A1 * | 8/2014 | Knop | G01N 33/14 | 422/69 |
| 2021/0302446 A1 * | 9/2021 | Joy | G01N 33/94 | |

OTHER PUBLICATIONS

Hamad A. H. Alsehaibania, Sherif Shaban Ragabb, Elkhabiry Shabanc, Synthesis and Photochromic Properties of Naphthopyran Dimers, Egypt. J. Chem. vol. 64, No. 12 pp. 7175-7180, 2021.*

* cited by examiner

*Primary Examiner* — Bijan Ahvazi
(74) *Attorney, Agent, or Firm* — Raj S. Davé; Davé Law Group, LLC

(57) ABSTRACT

In an embodiment, a method comprising: adding a composition comprising a photochromic dye to a sample having an opioid compound to form a reacted product; illuminating an electromagnetic ray having a wavelength between about 100 nm to about 600 nm on the photochromic dye; and detecting the opioid compound in the sample.

16 Claims, 19 Drawing Sheets

FLUORESCENT OPIOID BINDING COMPOUND AND USES THEREOF

RELATED APPLICATION

This invention claims priority from U.S. provisional application 63/413,737 titled, "FLUORESCENT OPIOID BINDING COMPOUND AND USES THEREOF" filed on Oct. 6, 2022, which is incorporated herein by reference in its entirety.

GOVERNMENT FUND

This invention was made with government support under grant number W911SR21C0020 awarded by the Department of Defense. The government has certain rights in the invention.

FIELD OF THE INVENTION

This invention relates to opioid binding compound and its use in detection of an opioid compound. In an embodiment, invention relates to creation of a chemical kit for providing an amplified visual signal for immediate real time detection of large area opioid contamination identification.

BACKGROUND OF INVENTION

Illegal transport of drugs of abuse is a serious problem for law enforcement, border patrol agents, officials monitoring transportation gateways (airports, ports, border checkpoints) and police at crime scenes.

Opioid abuse, and opioid traffic, causes a deadly toll for individuals, academic institutions, medical health care facilities, and police and border patrol agents. There is an important need to rapidly screen a parcel, suitcase, crime scene, vehicle surface, or suspected powder or liquid for opioid content.

Currently drugs of abuse are measured in suspected powder or liquid samples by sending samples to a forensic diagnostic lab for testing by mass spectrometry. Immunoassays are another approach that require incubation and waiting steps not applicable to point of care decision making in the field.

The prior art describes opioid screening using probes such as labeled antibodies or other ligands such as aptamers or opioid receptors to bind to the opioid analyte in a body fluid or test fluid. This is followed by washing away the unbound probe, and then measuring the amount of bound complex by a fluorescent or colorimetric detector. Example: EP2769219B. The other prior art describes opioid receptor antagonist molecules, or opioid molecule mimics, for therapeutic use. Such antagonists are not similar in chemical structure to the invention.

SUMMARY OF THE INVENTION

Existing disposable immunoassays and wipe tests cannot be used for gross contamination identification. A satisfactory solution phase detector system that can be sprayed over large surface areas does not exist.

Methods and systems for the trace detection of various opioids suffer from numerous limitations. Such limitations include efficacy, sensitivity, reproducibility etc. Various embodiments of the present disclosure address these limitations.

In an embodiment, present invention is not an immunoassay or other type of indirect ligand or sandwich assay.

In an embodiment, the present invention is a dye molecule that emits fluorescence in the presence of the analyte and does not require removal or washing of unbound species. The sensitivity achieved is high and is sufficient to meet government and law enforcement thresholds.

In an embodiment, drug detecting composition can be used to detect the contamination of surfaces by a drug of abuse, or alert border agents or law enforcement staff of the presence of opioid within a suspected powder or liquid.

In an embodiment, mix the detector fluorescent dye of the invention directly with a suspected powder or liquid sample, or with a swab of a surface sample, or sprayed on a suspected contaminated surface. This is followed by immediate illumination of the dye/sample combination with UV light (such as by a handheld UV flashlight) or point of care disposable quantitative device. The resulting fluorescence is a dose dependent measure of the concentration of the drug analyte (e.g., Fentanyl, Morphine, or Cocaine; common drug trafficking substances). The fluorescence persists for visual or emission detector measurement.

In an embodiment, a method comprising: adding a composition comprising a photochromic dye to a sample having an opioid compound to form a reacted product; illuminating an electromagnetic ray having a wavelength between about 100 nm to about 600 nm on the photochromic dye; and detecting the opioid compound in the sample.

In an embodiment, the illumination of the electromagnetic ray on the photochromic dye is configured to produce a desired colour. In an embodiment, the desired colour is produced in a dose-dependent manner.

In an embodiment, the method is capable of detecting the opioid compound in presence of an interfering substance.

In an embodiment, the sample comprises a body fluid or an article.

In an embodiment, the method does not employ washing of an unbound moiety of the sample to the photochromic dye to produce the desired colour.

In an embodiment, the photochromic dye is selected from a compound having Formula I to Formula XXIX.

In an embodiment, the illumination of the electromagnetic ray changes a first structure of the photochromic dye to a second structure of the photochromic dye.

In an embodiment, the composition further comprises an additive.

In an embodiment, the additive is configured to prevent the second structure of the photochromic dye from returning to its first structure after an excitation signal from the electromagnetic ray is removed.

In an embodiment, the additive is configured to increase a signal detection window.

In an embodiment, the additive comprises a nucleophile or an electrophile.

In an embodiment, the photochromic dye comprises an acidic florescent dye.

In an embodiment, the acidic florescent dye is configured to detect a piperidine derivative of the opioid compound with pKa range from 8 to 10.

In an embodiment, the second structure is configured to revert to the first structure on exposure of a visible light or through a thermal relaxation process. In an embodiment, detection of the opioid compound is real time basis.

In an embodiment, the method uses a UV light having a wavelength in a range of about 100 nm to about 450 nm.

In an embodiment, an additive is added in the sample after the addition of the photochromic dye.

In an embodiment, the additive enhances sensitivity of a reaction between the opioid compound and the photochromic dye.

In an embodiment, a product comprising a compound of Formula (XXIX), (Formula XXIX)

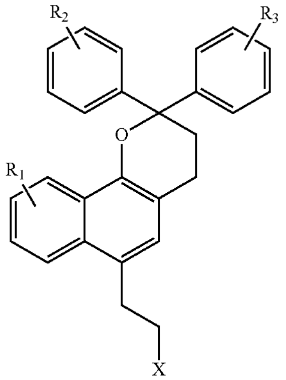

,

X = Br, I

R1, R2, R3 = H, alkyl, alkoxy, aryl, ester wherein X is a halogen, and R1, R2 and R3 are selected from H, alkyl, alkoxy, aryl and ester.

In an embodiment, the compound is colorless (Formula XXIX) in visible light having wavelength in a range of about 400 nm to about 700 nm.

In an embodiment, the compound (Formula XXIX) is a photochromic dye.

In an embodiment, the compound (Formula XXIX) is configured to produce a colour on excitation with a UV ray having a wavelength in a range of about 100 nm to 450 nm.

In an embodiment, the compound (Formula XXIX) is configured to react with an opioid compound.

In an embodiment, wherein the halogen in compound (Formula XXIX) is either bromine or iodine.

In an embodiment, the compound (Formula XXIX) the compound is configured to undergo nucleophilic substitution with a piperidine derivative of an opioid compound.

In an embodiment, a system comprising: a composition comprising a photochromic dye, a source of light configured to emit an electromagnetic radiation in a wavelength in a range of 100 nm to 600 nm and a device to detect the emitted fluorescence from the photochromic dye, wherein the system is configured to detect the opioid compound.

In an embodiment, the system is configured to provide a response on detection of the opioid compound on real time basis.

BRIEF DESCRIPTION OF THE FIGURES

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denotes the same elements.

DETAILED DESCRIPTION

Definitions and General Techniques

Figure 1A:
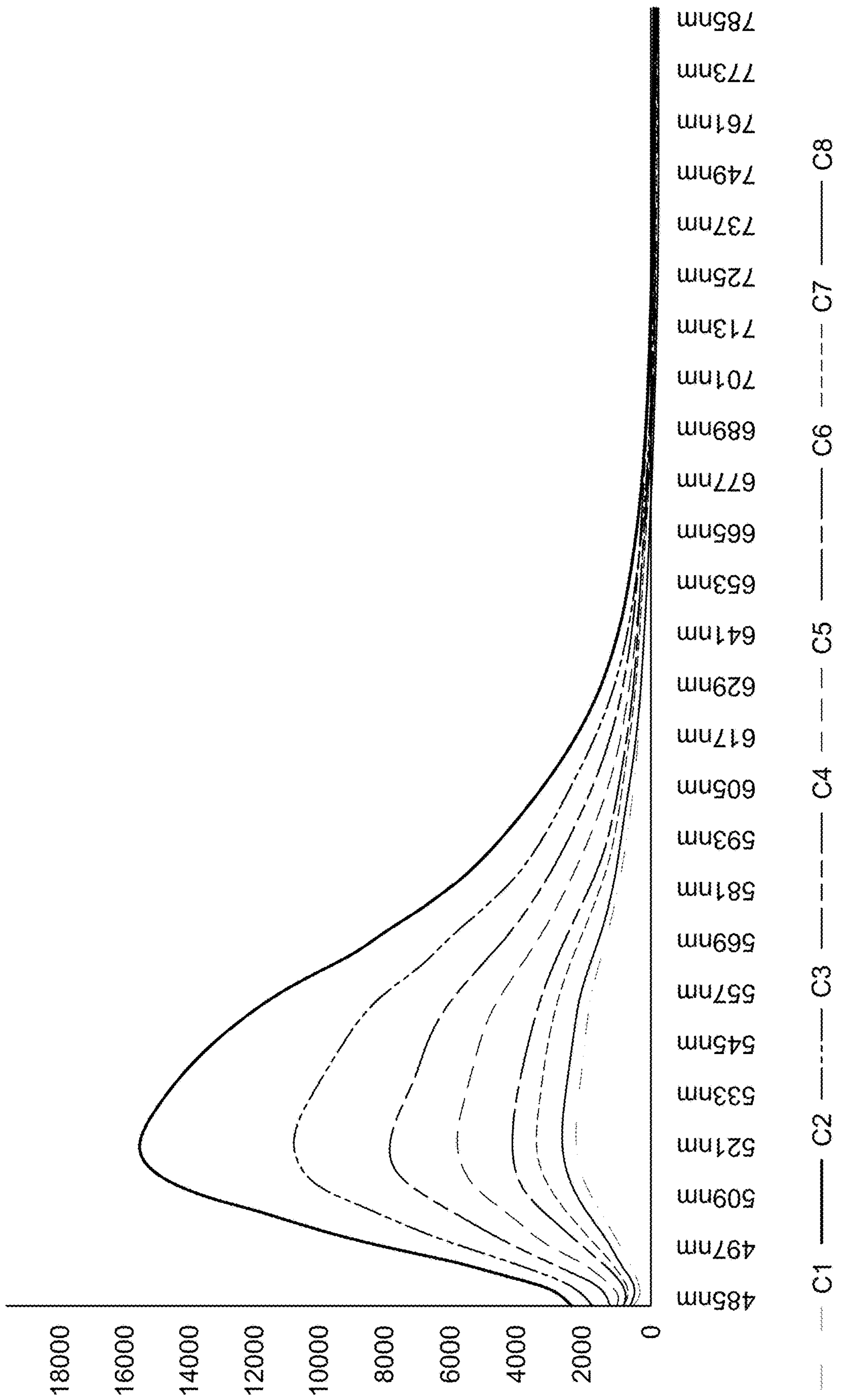
FIG. 1A shows emission measurement of 5-FAM dye at 50 µM concentration with/without Fentanyl. Emission intensity: C1: 5-FAM only (50 µM); C2: Fentanyl at 1,000 µM; C3: Fentanyl at 500 µM; C4: Fentanyl at 250 µM; C5: Fentanyl at 125 µM; C6: Fentanyl at 62.5 µM; C7: Fentanyl at 31.25 µM; C8: Fentanyl at 15.63 µM.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately", "about" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific, and technical terms used in connection with the present invention shall have meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

For the recitation of numeric ranges herein, each number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The following terms and phrases, unless otherwise indicated, shall be understood to have the following meanings.

The term, "opioid" is defined as a class of drugs that derive from, or mimic, natural substances found in the opium poppy plant. The term opioid includes opiates of natural product isolates, natural isolates processed by synthetic or enzymatic processes, and compounds possessing structural characteristics like the natural opiates yet obtained completely from synthetic processes, and the salt of the opiates or like.

Few examples of opioid are but not limited to morphine, heroin, codeine, oxycodone, hydrocodone fentanyl, apomorphine, hydromorphone, oxymorphone, codeine, dihydrocodeine, codeinone, thebaine, morphothebaine, thebenine, metathebainone, phenyldihydrothebaine, thebainhydroquinone, flavothebanone, alpha-codeimethine, acetylmethylmorphol, methylmorphenol, 14-hydroxycodeinone, sinomenine, dihydrosinomenine, hasubanonine, levorphanol, nalbuphine, nalmefene, naloxone, naltrexone, noscapine, opium, and oripavine.

In an embodiment, structurally similar, these compounds represent a range of hydrophilic character predominantly driven by the presence of oxygen-containing functionality (ketone, aryl ether, ring-fused/cyclic aryl-alkyl ether, phenol, primary and secondary alcohol), etc.

The term, "photochromic dye" is defined as a dye that change color in response to changes in lighting conditions, via reversible transformation of a chemical species between two forms by the absorption of electromagnetic radiation, where the two forms have different absorption spectra. These materials, and their current industrial applications, are reviewed in S. N. Corns et al., Coloration Technology, (2009), 125, 249-261. In an embodiment, if the photochromic dye produces fluorescence, then it can be designated as a florescent dye also. In some embodiments, photochromic dye and fluorescent dye terms may be interchangeably used. The dye may be acidic, basic, or neutral.

The photochromic dye may be a small molecule, or it may optionally be incorporated into a polymeric structure, for example by attachment to/as a side chain, or by inclusion in the main chain of the polymer.

Examples of some photochromic dye include diarylethenes; compounds that undergo heterolytic cleavage, such as spiropyrans, spiroxazines, and the like; fulgides and fulgimides; compounds that undergo cis-trans isomerization, such as stilbenes, aromatic azo compounds, and the like; benzopyrans and naphthopyrans (chromenes); bisimidazoles; spirodihydroindolizines; quinones; permidinespirocyclohexadienones; viologens; triarylmethanes; anils; and others. Dithienylethenes and fulgides are examples of molecules that generally exhibit thermal bistability. Spiropyrans and azabenzenes are examples of molecules that are both photochromic and thermochromic. Some specific examples of diarylethylenes include 1,2-bis-(2,4-dimethylthiophen-3-yl) perfluorocyclopentene; 1,2-bis-(3,5-dimethylthiophen-3-yl) perfluorocyclopentene; 1,2-bis-(2,4-diphenylthiophen-3-yl) perfluorocyclopentene; and the like.

The photochromic material may be a spiropyran, spiroxazine, stilbene, aromatic azo compound, benzopyran, naphthopyran, spirodihydroindolizine, quinone, permidinespirocyclohexadienone, viologen, fulgide, fulgimide, diarylethene, triarylmethane, or anil.

In an embodiment, dpiropyran dyes could be but are not limited to 1',3',3'-trimethyl-spiro[2H-1-benzopyran-2,2'-indoline (BIPS), 1',3'-Dihydro-1',3',3'-trimethyl-6-nitrospiro [2H-1-benzopyran-2,2'-(2H)-indole] (6-NO2-BIPS), 8-NO2-BIPS, 6-NO2-8-Br-BIPS, and 6,8-dinitro-BIPS.

The photochromic dye may be colorless under ambient light.

In an embodiment, photochromic dye could be combination of different dyes.

In an embodiment, photochromic, or photochromic dye, thus refers to, for example, the capability of the photochromic material or dye to change color from a first color state to a second color state different from the first color state, after exposure to an activating radiation, for example a radiation source having a wavelength from about 100 nm to about 1100 nm. The activating radiation may thus be in the ultraviolet (UV), visible or infrared regions, although the use of activating radiation in the UV region (from about 100 nm to about 400 nm) is most common. The change of color, or absorption behavior, may occur instantaneously on exposure to the activating radiation, or may occur after overcoming any activation phase. The color change exhibited by the photochromic dye is ideally reversible but should last for a period permitting the color change to be detected, for example a time frame of from about 0.5 second to about 1 hour, one day, one week, or more. Reversibility, or color cancellation, of the color change may be accelerated, depending on the selected photochromic materials, for example by heating, by exposure to a distinct wavelength radiation different from that of the first coloration (for example sun light radiation or other visible light such as room light), and the like.

In an embodiment, the photochromic dye may comprise one or more chromophores of these classes and may also comprise additional chromophores. The chromophores are typically substituted with groups intended to optimize the optical effects of the dye or optimize its solubility in a given medium and/or surface substantivity, as disclosed in U.S. Pat. No. 9,206,382B2, which incorporated herein by reference in its entirety.

The term, "sample" is defined broadly as the possible fluids or medium or an article which may be carrying the opioid compound. For example, but not limited to body fluids such as urine, saliva, or surface of carry bag containing an opioid compound, filter paper, swabs to collect the opioid compound, etc.

In an embodiment, opioid compound may be present on a sample in various states. For instance, in some embodiments, opioid compounds may be present on a sample in solid state, liquid state, gaseous state, or combinations of such states. In some embodiments, opioid compounds may be present on a sample in a solid state. In some embodiments, opioid compounds may be present on a sample in a liquid state.

Opioid compounds may be present in a sample in various amounts. For instance, in some embodiments, Opioid compounds may be present in a sample medium in amounts ranging from about 0.5 ng to about 100 mg. In some embodiments, Opioid compounds may be present on a sample medium in amounts ranging from about 100 ng to about 1 mg. In some embodiments, different opioid compounds may be present in a sample in total amounts ranging from about 10 ng to about 100 mg. In some embodiments, several opioid compounds may be present on a sample medium in total amounts ranging from about 100 ng to about 1 mg. In an embodiment, opioid compound may be present in the sample in an amount about 0.5 ng, 5 ng, 50 ng, 10 μg, 50 μg, 100 μg, 500 μg, 1 mg or more.

The term, "dose dependent curve" or "dose dependent" or like is defined as the magnitude of the response/emission as a function to the amount of the opioid compound, after a certain exposure time/reaction time. That is, the level of fluorescence measurement is quantitively correlated with the concentration of the opioid compound.

The phrase, "reaction time" or "exposure time" or like is defined as a time required to an opioid compound and a photochromic dye to react together to provide a colored compound for felicitation of detection of the opioid compound. A reactions time may be instantaneous, without any time lapse. In some embodiment, reaction time may vary from few minutes (ex: 5 mins) to few hours (ex: one hour). In some embodiment, heat or chemical or any catalyst may be required to enhance a reaction of an opioid compound and a photochromic dye.

The phrase, "interfering substance" is broadly defined as any unwanted substance that may adversely affect the emission spectra of the photochromic dye. For example: presence of flour, sugar etc. in a composition comprising an opioid compound.

The phrase, "sensitivity" is defined as how efficiently an opioid compound could be detected by a photochromic dye using methods described in various embodiments of this invention. In an embodiment, a photochromic dye could detect 0.25 nM, 0.5 nM, 5 nM, 500 nM, 5 μM, 10 μM, 500 μM, 1 mM, 5 M, 500 mM or more of an opioid compound present in a solution.

In an embodiment, sensitivity of the method is detection of less than 0.5 mg, 1 mg, 2 mg, 4 mg, 10 mg of the opioid compound distributed over per square meter.

The phrase, "additive" is defined as a molecule added to stabilize a final product (ex: colored product) formed by reaction of an opioid compound and a photochromic dye or signal strength produced on illumination of electrochemical ray. An additive may be an electrophile or neutrophile. In an embodiment, appropriate selection of electrophile for stabilization would depend on the desired color of the final product, and likelihood of reactions with other constituents on testing surfaces. Examples of electrophiles to consider include but are not limited to halides, carbonates, nitrates, and sulfates, and chemicals containing these functional groups.

In an embodiment, a photochromic dye and an additive may form a composition. In an embodiment, photochromic dye or mixture of photochromic dyes will be present in the composition in an amount from 0.00001 to 50 wt. % of the composition. In an embodiment, photochromic dyes in the composition may be 0.0005 wt. % to 1 wt. %, or to 0.5 wt. % of the composition or 5 wt. % of the composition or 15 wt. % of the composition or 50 wt. % of the composition or 75 wt. % of the composition or more.

In an embodiment, dye may be first formed into a pre-mix, for example a particle or concentrated liquid for incorporation into the composition.

The color change exhibited by the photochromic dye is ideally reversible. The phrase, "signal enhancement detection window" or "signal detection window" or like is defined as a time during which the final product (ex: colored product) formed by reaction of an opioid compound and a photochromic dye remain stable and do not undergo reversible change. In an embodiment, signal enhancement detection window could be 1 min, 5 mins, 10 mins, 15 mins, 30 mins, 1 hr, 2 hr, 5 hr, one day, one week, or more.

The embodiments described herein below, are to be construed as illustrative and not as constraining the remainder of the disclosure in any way whatsoever. While the embodiments have been shown and described, many variations and modifications thereof can be made by one skilled in the art without departing from the spirit and teachings of the invention.

An embodiment of the invention relates to stable opioid binding ligands including dyes, and novel organic chemistries that recognize opioids, that can be applied to high output fluorescent and colorimetric dyes, and highly stable labeling chemistries being developed and studied by the applicant team.

The invention is a breakthrough because it is a new class of organic fluorescent dye molecules that emit fluorescence in the visual wavelength after being combined with the opioid. The fluorescence emission of the dye/opioid combination can be stimulated by UV light.

In an embodiment, reagents and molecular probes have been developed for biomarker discovery and drugs of abuse testing in oral fluid.

In an embodiment, the invention could lead to a spray solution of dye (low cost and stable indefinitely) that changes visual color or fluorescence under UV illumination if an opioid family drug is present on the surface.

Method of Detection

There are different major methods of achieving opioid detection sensitivity utilizing photochromatic dyes:

Method 1:

Incorporating a photochromic dye that reacts to opioid compounds into a polymer-based particle that is optically clear and UV transmissive. This particle is labelled with a small molecule drug that is displaced by the opioid moiety of interest. When the opioid has been captured, the detection of the opioid of interest will be measured by exposing the system to UV wavelengths to excite the photochromic containing particle to react and change color. The chromatic change is optically visible and highly sensitive.

In an embodiment, various methods may be utilized to detect colors that are generated upon the reaction of opioid of interest and photochromic. In some embodiments, the generated color may be detected visually by the naked eye. In some embodiments, the generated color may be detected by utilizing an optical instrument. In some embodiments, the optical instrument may be in a handheld chemical detection unit. In some embodiments, the chemical detection unit may contain an optical instrument that includes light emitting diodes and an optical sensor. In some embodiments, the light emitting diodes illuminate the sample medium with various colors of light to allow for detection of a spectral pattern of colors by the optical sensor.

An exemplary photochromic dye having a Formula (I) and its reversible color change reaction is shown below:

(Scheme 1)

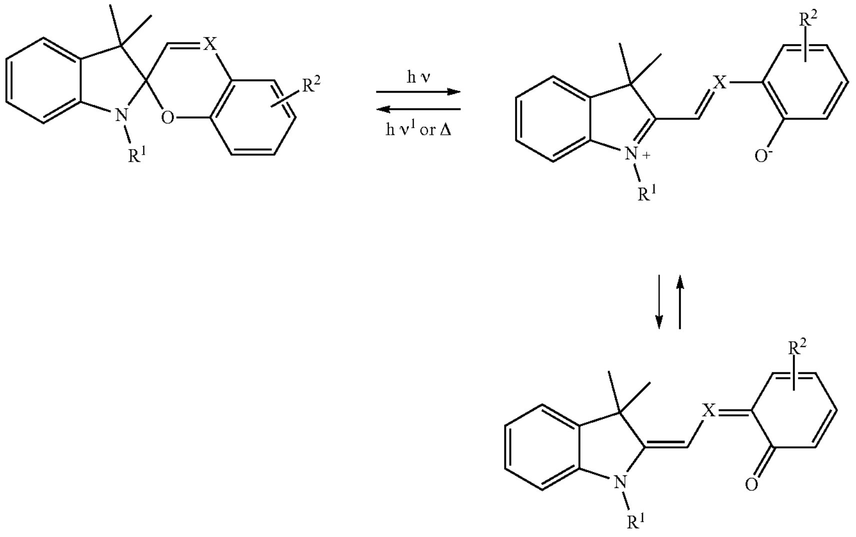

In Scheme I, compound on the left, representing a generic spiropyran compound, can be converted to the compounds on the right, representing the generic merocyanine isomers (enol and keto forms) through the application of UV light. The merocyanine form can convert back to the spiropyran form through thermal relaxation or irradiation with visible light. Binding to the opioid candidate analyte would sensitize the compound.

Table 1 below provides absorption maxima of colored form of spiroindoline benzopyran with Formula (II) in ethanol.

(Formula II)

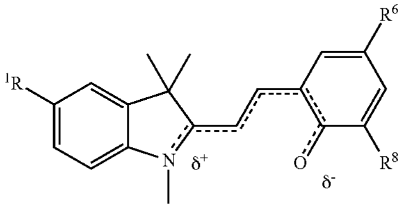

TABLE 1

Absorption maxima of the colored form of 6,8-disubstituted spiroindoline benzopyran with Formula (II) in ethanol.

| Compound | $R^6$ | $R^8$ | $R^1$ | $\lambda_{max}$, nm |
|---|---|---|---|---|
| (9a) | $NO_2$ | H | H | 532 |
| (9b) | H | $NO_2$ | H | 544 |
| (9c) | $NO_2$ | MeO | 5'-Br | 550 |
| (9d) | MeO | $NO_2$ | 5'-Br | 590 |
| (9e) | $NO_2$ | MeO | 5'-Ph | 568 |
| (9f) | MeO | $NO_2$ | 5'Ph | 625 |
| (9g) | $NO_2$ | Br | H | 533 |
| (9h) | Br | $NO_2$ | H | 570 |
| (9i) | $NO_2$ | Cl | H | 535 |
| (9j) | Cl | $NO_2$ | H | 560 |

Another photochromic material, diarylethene having Formula (III) and undergoing a reversible color change reaction as shown below in Scheme II:

(Scheme II)

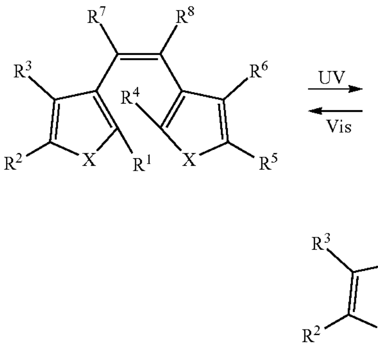

Diarylethene compound having a Formula (III) on the left, representing a generic open-ring isomer diarylethene compound, can be converted to the compound on the right, representing a generic closed ring isomer diarylethene compound, through the application of UV light. The closed ring isomer can convert to the open ring isomer through irradiation with visible light.

The reversible change of diarylethene having Formula (III) is shown in U.S. Pat. No. 9,868,873B2, which is incorporated by reference in its entirety.

In an embodiment, multiple different dyes may be used in tandem for detection of the opioid compound.

Method 2: Prolonging Excitation Time Course:

A method of prolonging the time course of the photochromic dye UV excitation reaction by incorporating a small molecule (ex: an additive) that will prevent the photochromic dye structure from returning to original confirmation when the excitation signal is removed. This will prolong the signal enhancement detection window for users to diagnose.

In an embodiment, addition of an additive could increase signal enhancement detection window, by about 5% of the actual signal enhancement detection window, 10% of the actual signal enhancement detection window, 50% of the actual signal enhancement detection window, 100 200% of the actual signal enhancement detection window, 500% of the actual signal enhancement detection window or more.

Upon excitation with UV radiation between 300-400 nm, the primary component will either have a bond broken or a bond formed, changing the color of the component. These newly broken or formed bonds are the result of high-energy irradiation; thermal relaxation and exposure to visible light will cause the colored products to revert to their more stable colorless forms.

In an embodiment, It may be desirable to prevent the thermal relaxation of the molecule such that upon binding to the desired product, it permanently retains its color. This could be accomplished by utilizing small molecule additives that will undergo chemical interactions only with the newly formed or broken chemical bonds in the colored primary component, preventing the re-formation of the colorless precursor molecule. An example of this kind of reaction is represented below using a dye of Formula (IV) in scheme III.

(Scheme III)

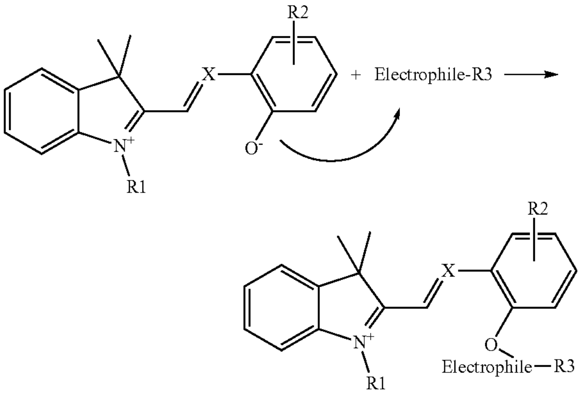

As shown above, nucleophilic attack of an electrophile in solution by the phenoxide ion in the merocyanine dye of Formula (IV) form results in bond formation and prevents the thermal relation of the compound back to the colorless spiropyran.

For example, the merocyanine compound of Formula (IV) contains a reaction nucleophilic phenoxide ion that attacks the electrophilic ═N+ to reform the colorless spiropyran molecule. However, by including an additional nucleophilic compound in the solution, it may be possible to trap the merocyanine form in its colored state. Selection of the appropriate electrophile could be used to further increase sensitivity to slight change the color of the merocyanine dye. This nucleophile could be included in the sample or could be added post-flow of the sample depending on the reactivity of the electrophile.

In an embodiment, appropriate selection of electrophile for stabilization would depend on the desired color of the final product, and likelihood of reactions with other constituents on testing surfaces. Examples of electrophiles to consider include but are not limited to halides, carbonates, nitrates, and sulfates, and chemicals containing these functional groups.

In an embodiment, Appropriate selection of spiropyran dye for this kind of modification would depend on the R1 and R2 substituents and would favor compounds with limited tautomerization to the keto form versus the active enol form.

In an embodiment, amount of a photochromic dye required for detection of an opioid compound could vary from 1 nM, 5 nM, 50 nM, 500 nM, 1 μM, 5 μM, 50 μM, 500 μM, 1 mM, 5 mM, 500 mM, 5M, 50M, or more.

Dyes

An embodiment relates to different photochromic dye that can be employed for detection of an opioid compound.

In an embodiment dye is a fluorescent dye. The chemical structures are referred to fluorophores with absorbance wavelength above 400 nm, emission wavelength above 450 nm to near IR wavelength containing function groups of carboxylic acid, sulfonic acid or phosphonic acid in the end.

In an embodiment, present invention relates to a novel organic photochromic dye composition of matter (Bodipy family, 5-carboxyfluorescein (5-Fam) with specific novel substitutions) that undergoes an immediate dose-dependent fluorescent emission when the compound is directly combined with drugs of abuse including morphine, cocaine, and fentanyl, even in the presence of interfering substances mixed in excess.

In an embodiment, following are example structures of 5-carboxyfluorescein (5-FAM) dye related structure as shown below:

(Formula V)

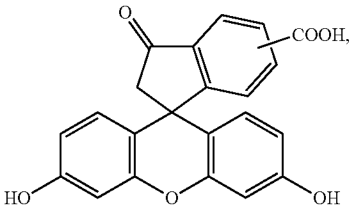

(Formula VI)

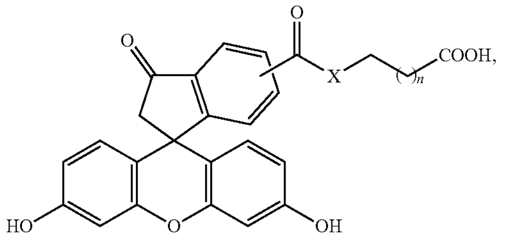

X = O, N
n = 0-10

-continued (Formula VII)

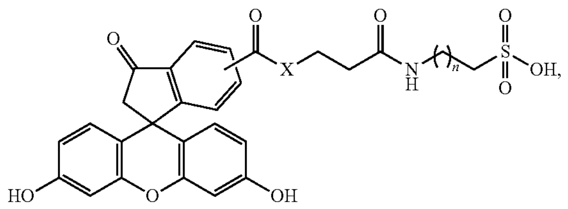

X = O, N
n = 0-10

(Formula VIII)

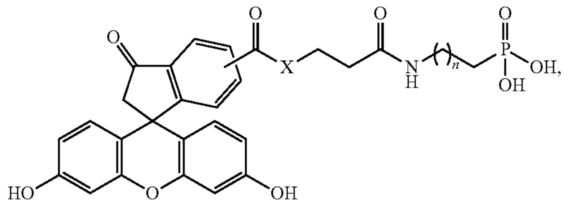

X = O, N
n = 0-10

(Formula IX)

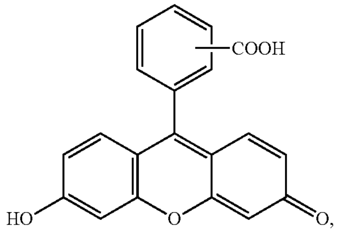

(Formula X)

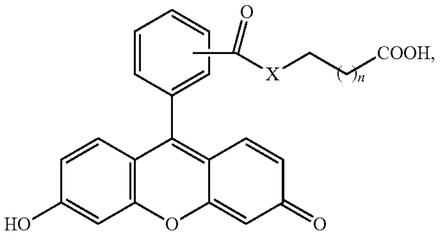

X = O, N
n = 0-10

(Formula XI)

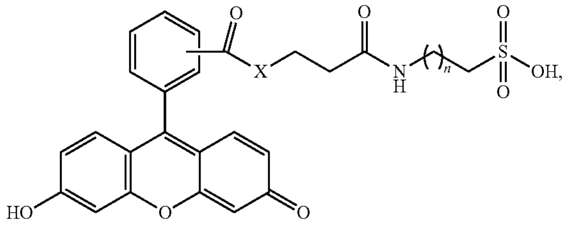

X = O, N
n = 0-10

-continued
(Formula XII)
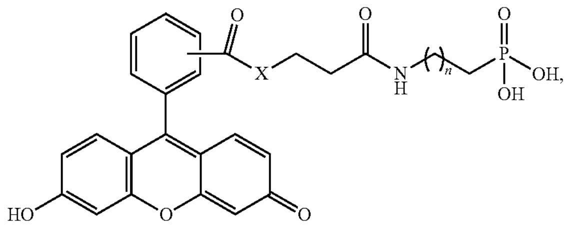
X = O, N
n = 0-10
In an embodiment, dye could have bodipy dye related structures. Few dye structures are shown below as examples:
(Formula XIII)
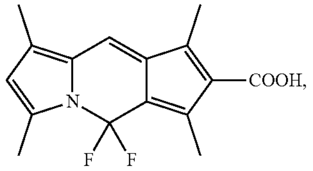
(Formula XIV)
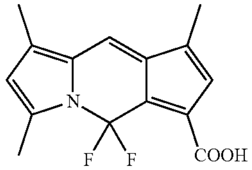
(Formula XV)
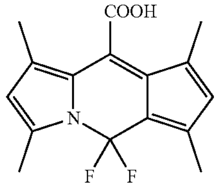
(Formula XVI)
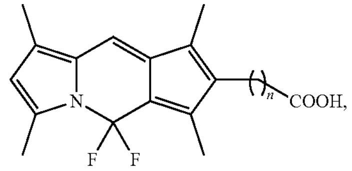
n = 0-10
(Formula XVII)
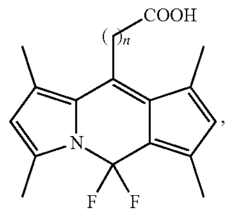
n = 0-10
-continued
(Formula XVIII)
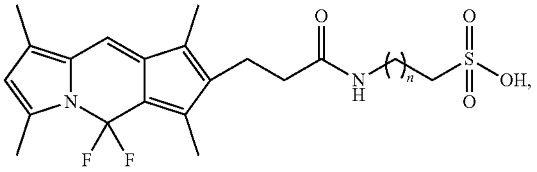
n = 0-10
(Formula XIX)
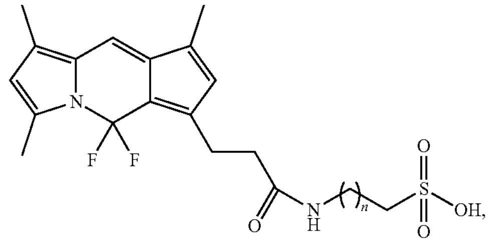
n = 0-10
(Formula XX)
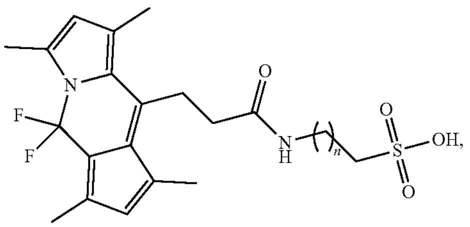
n = 0-10
(Formula XXI)
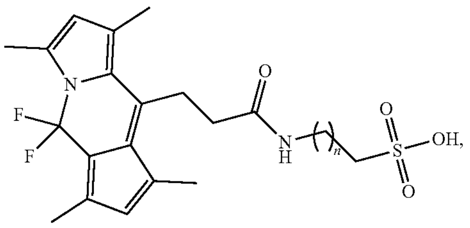
n = 0-10
(Formula XXII)
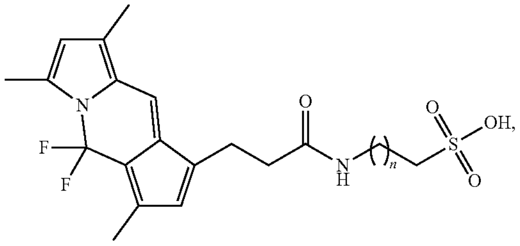
n = 0-10
(Formula XXIII)
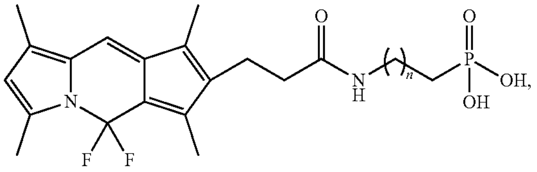
n = 0-10

-continued (Formula XXIV)

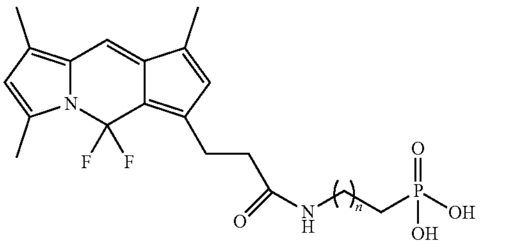

n = 0-10

(Formula XXV)

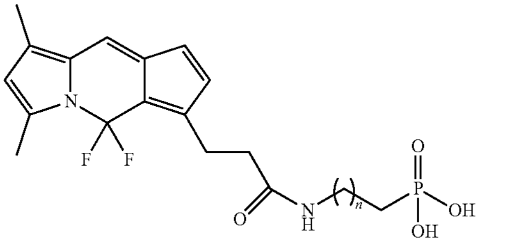

n = 0-10

(Formula XXVI)

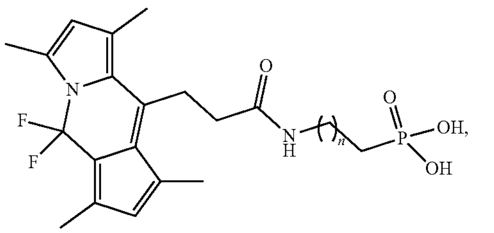

n = 0-10

-continued (Formula XXVII)

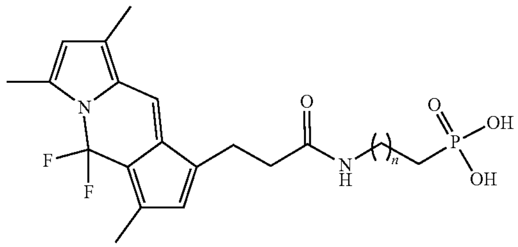

n = 0-10

In an embodiment, 4,4-Difluoro-4-bora-3a,4a-diaza-s-indacene (BODIPY) dye is a small molecule with strongly UV absorbance that emit relatively sharp fluorescence above 500 nm. BODIPy dyes are relatively stable to the pH of their environment and physiological conditions, they are widely used to label proteins and DNA.

There is a great potential to develop novel BODIPY probes through chemical modification of their framework, especially in making water soluble BODIPY dyes.

In an embodiment, we designed a sulfonic acid BODIPY dye to detect opioid substance such as Fentanyl through its basic property of piperidine ring. As shown in Scheme IV, BODIPY sulfonic acid 1 is synthesized from BODIPY and chlorosulfonic acid under cold conditions. Fentanyl or its analogs will be detected through common acid-base reaction by producing a fluorescent water-soluble salt. Fentanyl or its analogs can be identified through LC-MS analysis for characterization and quantification. Further optimization can lead to near IR BODIPY dyes by substitution with electron donating aromatic rings as shows in scheme IV.

Scheme IV Provides Design of a Water-Soluble Fentanyl Bodipy Dye:

(Scheme IV)

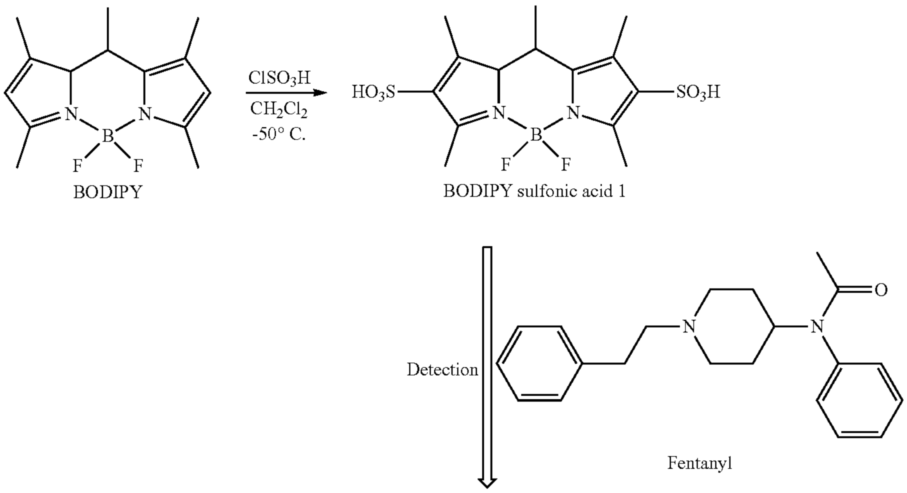

BODIPY

BODIPY sulfonic acid 1

Fentanyl or Fentanyl derivitives

-continued

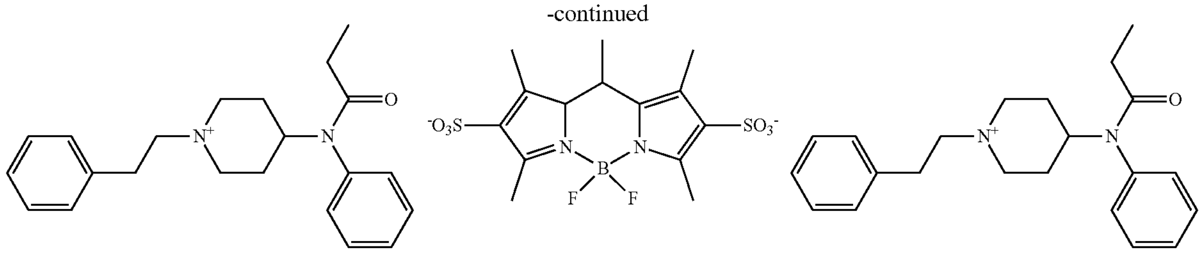

Water Soluble Fentanyl BODIPY Sulfanante Salt 2
Emission: 533 nm

In an embodiment, near IR BIODIPY dye having Formula (XXVIII) is shown below:

(Formula XXVIII)

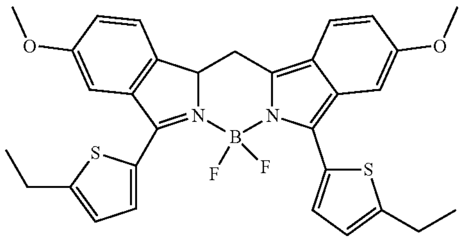

Aromatic ring fused system
Emission: 780 nm

In an embodiment, an alternative strategy to detect opioid substance is shown in scheme V by design organic photochromic dyes. Many photochromic materials change color upon irradiation with UV or visible light and reverse back to their original color by removing the illuminant. Here we designed an alkyl halide substituted bromo [1,2-b] naphthopyran dye (Formula XXIX) through acidic substance aluminum oxide in toluene solvent, colorless dye (Formula XXIX) will produce a colored isomer 7 (colored dye 7 in scheme V) upon UV irradiation. Nucleophilic substitution of Fentanyl piperidine tertiary amine with bromo dye 7 (colored dye 7 in scheme V) will produce a fluorescent tertiary ammonium salt in aqueous solution. Since most opioid substances contain tertiary amine structure like Fentanyl, we anticipate the proposed dye would have a general use to detect and identify opioid substance not just limited to Fentanyl related compounds.

The new dye has Formula (XXIX) as shown below:

(Formula XXIX)

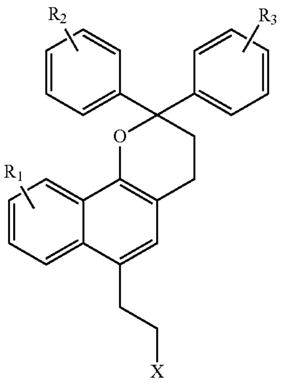

X = Br, I
R1, R2, R3 = H, alkyl, alkoxy, aryl, ester

In an embodiment, X in the Formula (XXIX) is selected from a halogen, more specifically bromine or Iodine. In an embodiment, X in Formula XXVIII may be a halo group. As used herein, and unless otherwise indicated, recitations of "halo group" and related terms (such as, but not limited to, haloalkyl groups, haloalkenyl groups, haloalkynyl groups, haloaryl groups and halo-heteroaryl groups) means a group in which at least one, and up to and including all the available hydrogen groups thereof is substituted with a halo group. The term "halo-substituted" is inclusive of "perhalo-substituted." As used herein, the term perhalo-substituted group and related terms (such as, but not limited to perhaloalkyl groups, perhaloalkenyl groups, perhaloalkynyl groups, perhaloaryl groups and perhalo-heteroaryl groups) means a group in which all the available hydrogen groups thereof is substituted with a halo group. For example, perhalomethyl is —CX3; perhalophenyl is —C6X5, where X represents one or more halo groups (e.g., I).

In an embodiment, R1, R2 and R3 are independently selected from hydrogen (H), alkyl, alkoxy, aryl and ester.

As used herein, the term "alkyl" means linear or branched C1-C20 alkyl, such as, but not limited to linear or branched C1-C10 alkyl or linear or branched C2-C10 alkyl. Examples of alkyl groups from which the various alkyl groups of the present invention can be selected from, include, but are not limited to, methyl, ethyl, propyl, isopropyl, butyl, isobutyl, sec-butyl, tert-butyl, pentyl, neopentyl, hexyl, heptyl, octyl, nonyl and decyl. Alkyl groups of the various compounds of the present invention can, with some embodiments, include one or more unsaturated linkages selected from —CH═CH— groups and/or one or more —C≡C— groups, provided the alkyl group is free of two or more conjugated unsaturated linkages. With some embodiments, the alkyl groups are free of unsaturated linkages, such as —CH═CH— groups and —C≡C— groups. All references, including granted patents and patent application publications, referred herein are incorporated herein by reference in their entirety.

As used herein, the term "aryl" includes carbocyclic aromatic rings or ring systems. Examples of aryl groups include phenyl, naphthyl, biphenyl, fluorenyl, indenyl, but is not limited to, C5-C18 aryl. Examples of aryl groups, as disclosed in U.S. Pat. No. 9,028,728B2, U.S. Pat. No. 9,856,254B2 which are incorporated by reference in its entirety.

As used herein, the term "alkoxy" refers to an alkyl group which is singularly bonded to oxygen; thus R—O. For example, but not limited to methoxy (CH3O—), ethoxy group (CH3CH2O—), ethyl phenyl ether (C6H5OCH2CH3, also known as ethoxybenzene). Related to alkoxy groups are aryloxy groups, which have an aryl group singularly bonded to oxygen such as the phenoxy group (C6H5O—). An alkoxy or aryloxy group bonded to an alkyl or aryl (R—O—

R') is an ether. If bonded to H it is an alcohol. An alkoxide can refer to salts of alcohols, and they are ionic compounds containing an alkoxide ions RO—; it is a derivative of an alcohol where the hydrogen of the —OH group is replaced by a metal, for example sodium salt of ethanol (CH3CH2OH) is sodium ethoxide, containing ethoxide anions CH3CH2O— and sodium cations Na+.

As used herein, the term, "ester" refers to a chemical compound derived from an acid (organic or inorganic) in which at least one —OH hydroxyl group is replaced by an —O— alkyl (alkoxy) group.

In an embodiment, scheme V provides design of Fentanyl photochromic dye using Formula (XXIX)

(Scheme V)

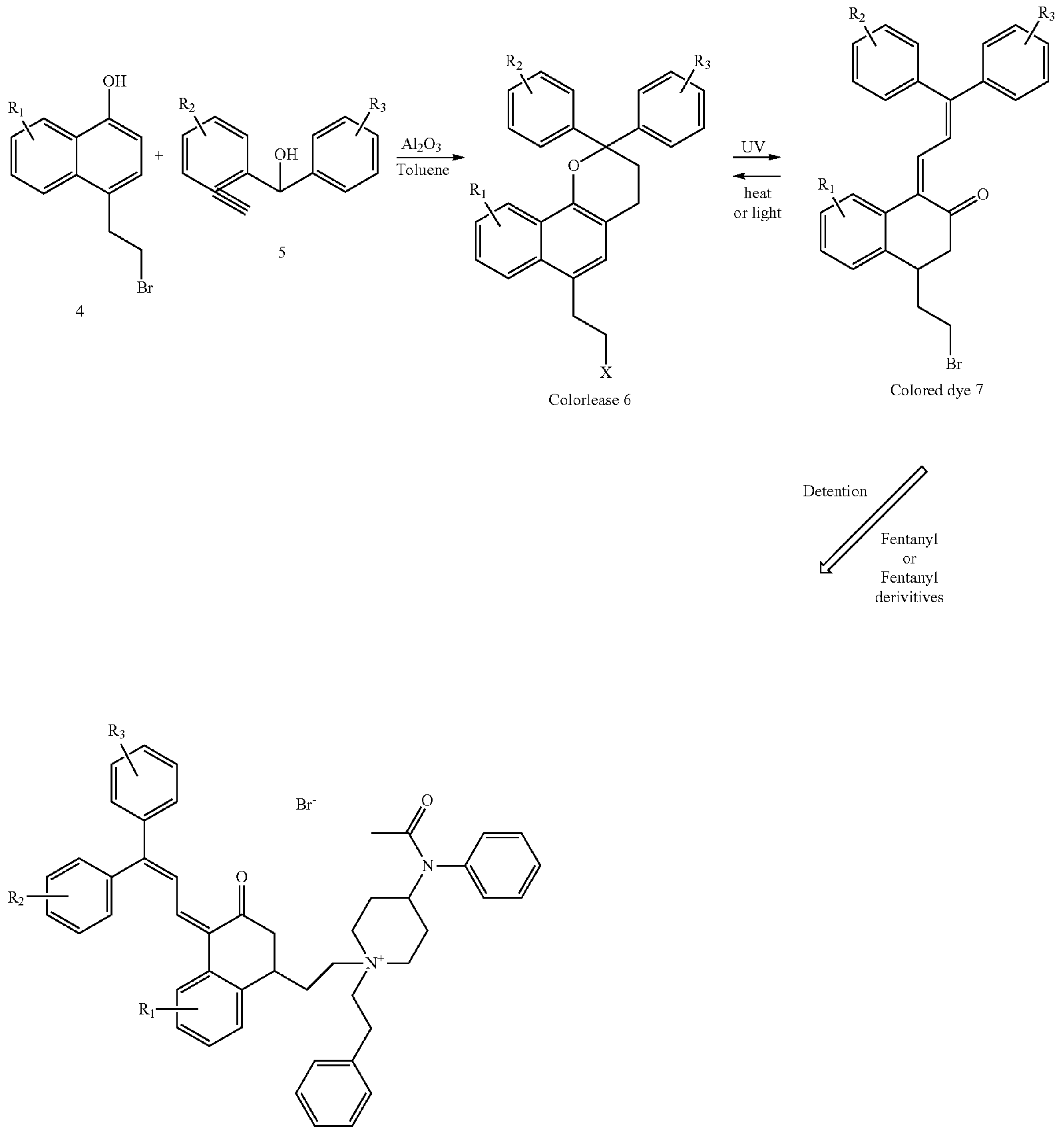

4

5

Colorlease 6

Colored dye 7

Colored dye 8

R1,R2, R3, or M alkyl, ethoxy, aryl etc

In an embodiment, reversible color change of photochromic compound having Formula (XXIX) in presence of opioid compound by an electromagnetic ray is shown below in Scheme VI:

(Scheme VI)

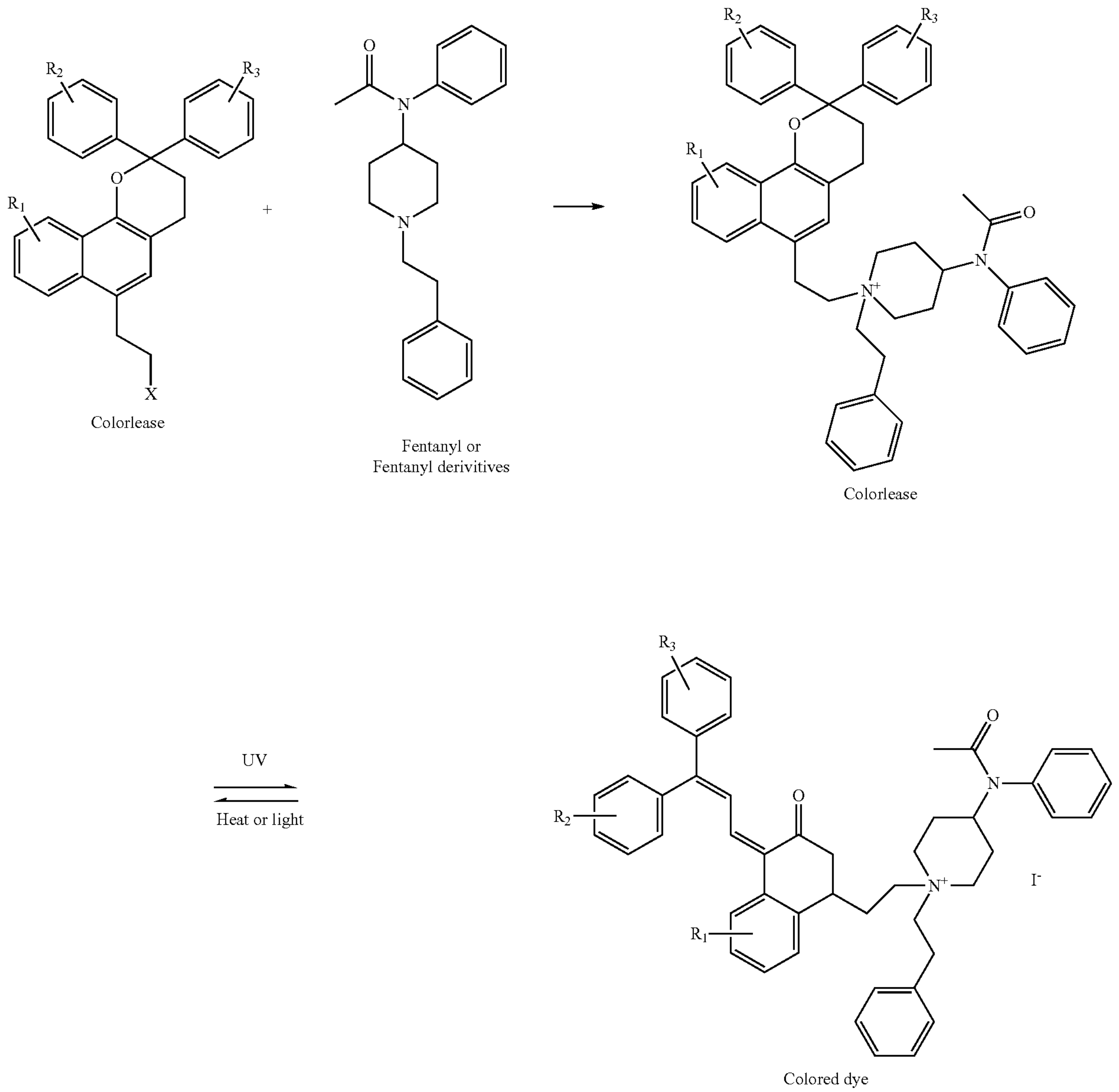

Colorlease

Fentanyl or
Fentanyl derivitives

Colorlease

Colored dye

X = Br, I, COOH, $SO_3H$, $PO_3H$

R1, R2, R3 = H, alkyl, ethoxy, aryl etc.

System

The invention is a compound that can be used in a swab, or spray, or testing dropper solution, to immediately detect the presence of general classes of drugs of abuse in one step. The test is a visual or quantitative screen permitting a quick on-site decision and can be validated for legal evidence by a companion laboratory mass spectrometry assay.

In an embodiment, sample may be collected on a sampling medium. A sample medium generally refers to a region, structure or system component that can be used to detect a substance. In some embodiments, the sample medium includes, without limitation, filter papers, porous sheets of fibers, porous papers, and combinations thereof. In some embodiments, sample medium is a filter paper. Various types of materials may also be used as sample media. For instance, in some embodiments, the materials in the sample medium include, without limitation, papers, polyesters, cotton, plastics, and combinations thereof. In more specific embodiments, the sample medium includes at least one of a cotton-based filter paper, a polyester-based filter paper, a plastic-based filter paper, and combinations thereof.

In an embodiment, kit could be disposable, stable for years in harsh environments, and attain a sensitivity of less than 2 micrograms distributed over one square meter.

In an embodiment, system to detect opioid compound using fluorescent dyes involves integrating fluorescence-based detection technology with a user-friendly and portable system, which may include:

Sample Collection Module: This module will allow the user to collect the sample for analysis. Depending on the intended application, the device can be designed to accept various sample types, such as surface swipes, oral fluid, urine, or sweat.

For instance, in some embodiments, an opioid compound may be collected on a sample medium by swiping the sample medium onto a surface that contains the substance. In some embodiments, an opioid compound is collected on a sample medium by dropping a liquid containing the substance onto the sample medium. In some embodiments, an opioid compound is collected on a sample medium by exposing the sample medium to a gaseous environment containing the substance. Additional methods of collecting substances on sample media can also be envisioned.

Sample Preparation: The collected sample may need some preparation steps to extract the drug compounds and remove any potential interfering substances that could affect the detection process.

Fluorescent Dye Reagents: The device will contain specific fluorescent dye reagents that have an affinity for the target drug compounds. Each fluorescent dye will be selective to a particular drug or group of drugs, allowing for multiple drug detection capabilities.

In one embodiment, the reaction between an opioid compound and a photochromic dye may take place at room temperature.

Excitation Light Source: The device will include a light source that emits a specific wavelength to excite the fluorescent dyes when they interact with the drug compounds in the sample.

Fluorescence Detection System: A fluorescence detection system will capture the emitted fluorescence from the dye-drug compound interaction. The system will measure the intensity and wavelength of the emitted fluorescence, which correlates with the presence and concentration of the drug.

Signal Processing and Analysis: The device will have onboard processing capabilities to analyze the fluorescence data and interpret the results. The device's software will have a predefined library of drug signatures to match the detected fluorescence patterns with specific drugs of abuse.

Display and User Interface: A user-friendly display and interface will provide clear instructions and real-time results to the user. It may include a screen to show drug detection results, simple prompts for sample collection, and indicator lights to guide the user through the testing process.

Power Source: The device can be powered by rechargeable batteries or other portable power sources, making it easily transportable for field use.

In an embodiment, the system is a portable system.

The potential commercial uses are law enforcement, border patrol, prison management, military, crime scene investigation and any situation where a rapid determination of the presence of opioids is suspected. The chemistry can be commercialized as a disposable pre-loaded packaged swab or spray vial that is opened at the crime scene and used to sample suspected surfaces.

In an embodiment, stimulated emission can be measured in three ways, a) UV illumination and stimulated emission of the photochromic dye interacting with the opioid on the swab itself visually or read by a plugging the swab into a hand-held reader,
b) inserting the swab into a solution containing the photochromic detector dye, or,
c) spraying or blotting the photochromic dye on a surface and then illuminating the surface with a handheld standard UV flashlight for visual detection.

In an embodiment, detection of the emission can be performed by a computing device, e.g., a portable computing device for detection, data collection, and communications.

In an embodiment, for opioids or drugs of abuse dried on a surface, surface properties or surface coatings may interfere with solubilization of the analyte for a spray application. There may be subjectivity for visual reading. Consequently, a swab sampled specimen read by a hand-held reader will reduce subjectivity and can be followed by laboratory confirmation.

In an embodiment, system provides for the automated colorimetric detection of targeted substances with reporting and evidence collection tools. It makes it easy for users such as law enforcement to accurately detect substances of interest while removing the hassle of reporting and paperwork. The reporting functionality allows a user to transmit results over a communications network as desired.

In an embodiment, system may include a receptacle or pouch within which one or more ampoules are adapted to release one or more chemicals (e.g., photochromic dye) to an area defining a test location. The one or more chemicals are released to flow, by gravity, to at least one test area. In systems where multiple ampoules are utilized, sequencing of the chemicals from those ampoules can be done to achieve sequential chemical flows, resulting in multiple chemical reactions facilitating more complex colorimetric detection. In an embodiment, system may be like those described in U.S. Pat. No. 9,978,153B2, which is incorporated herein by reference in its entirety.

In an embodiment, opioid compound could be collected in a pad of a card component collected by swiping the pad on suspected surface. The card component, when inserted in a chemical detection unit (CDU), release reaction chemicals from flexible walled capsules containing photochromic dye in a desired sequence. The pad of the card component containing opioid compound and chemicals are illuminated with UV lamp in the chemical detection unit to produce a spectral pattern that is analyzed by the optical electronics in the CDU and results are displayed, stored and/or transmitted over a communications network. Exemplary examples are disclosed in U.S. Pat. Nos. 9,482,621B2, 10,203,310B2, which are incorporated herein by reference in its entirety.

In an embodiment, photochromic dye could be present in one ampule and the additive (electrophile or nucleophile) could be present in another ampule. In an embodiment, a system may have a flow modulating device to control flow of the chemicals from the ampoules. An exemplary example is US20220080407A1, which is incorporated herein by reference in its entirety.

EXAMPLES

Example 1

Acidic florescent chemical dye is chosen to detect the opioid substance fentanyl, morphine, or cocaine etc., as fentanyl, morphine and cocaine are piperidine derivatives with pKa range from 8-10 respectively. Interaction between acidic dye and fentanyl through acid-base reaction and hydrogen bond interaction is expected to result color change of the dye, and detect the opioid substance either by emission measurement, UV irradiation or naked eye.

5-carboxyfluorescein (5-FAM) was used as a chemical dye to detect opioid drugs such as fentanyl, morphine, and cocaine. At 50 μM concentration of 5-FAM, these three substances demonstrated a significant dose response with increased emission intensity as low as opioid concentration at 15.63 μM.

Figure 1B:
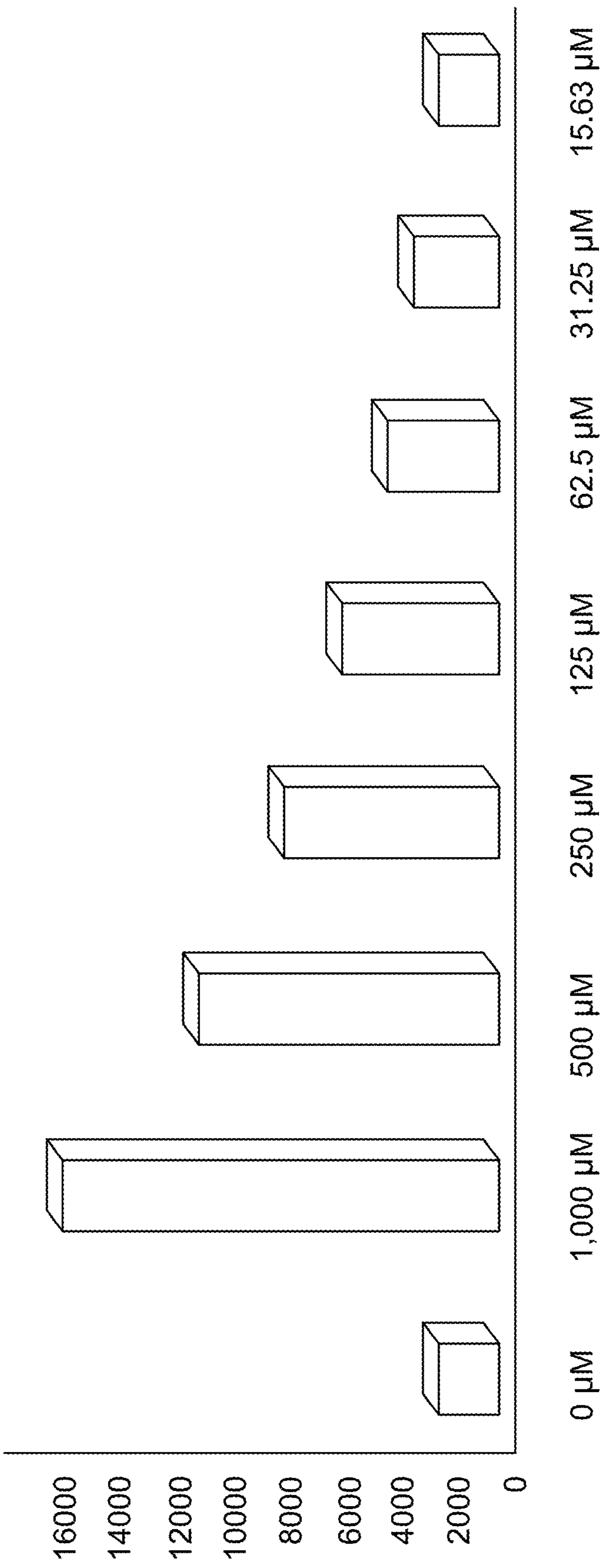
FIG. 1B shows the dose response pattern of 5-FAM with/without Fentanyl at maximum emission wavelength of 523 nm, respectively.
Figure 2A:
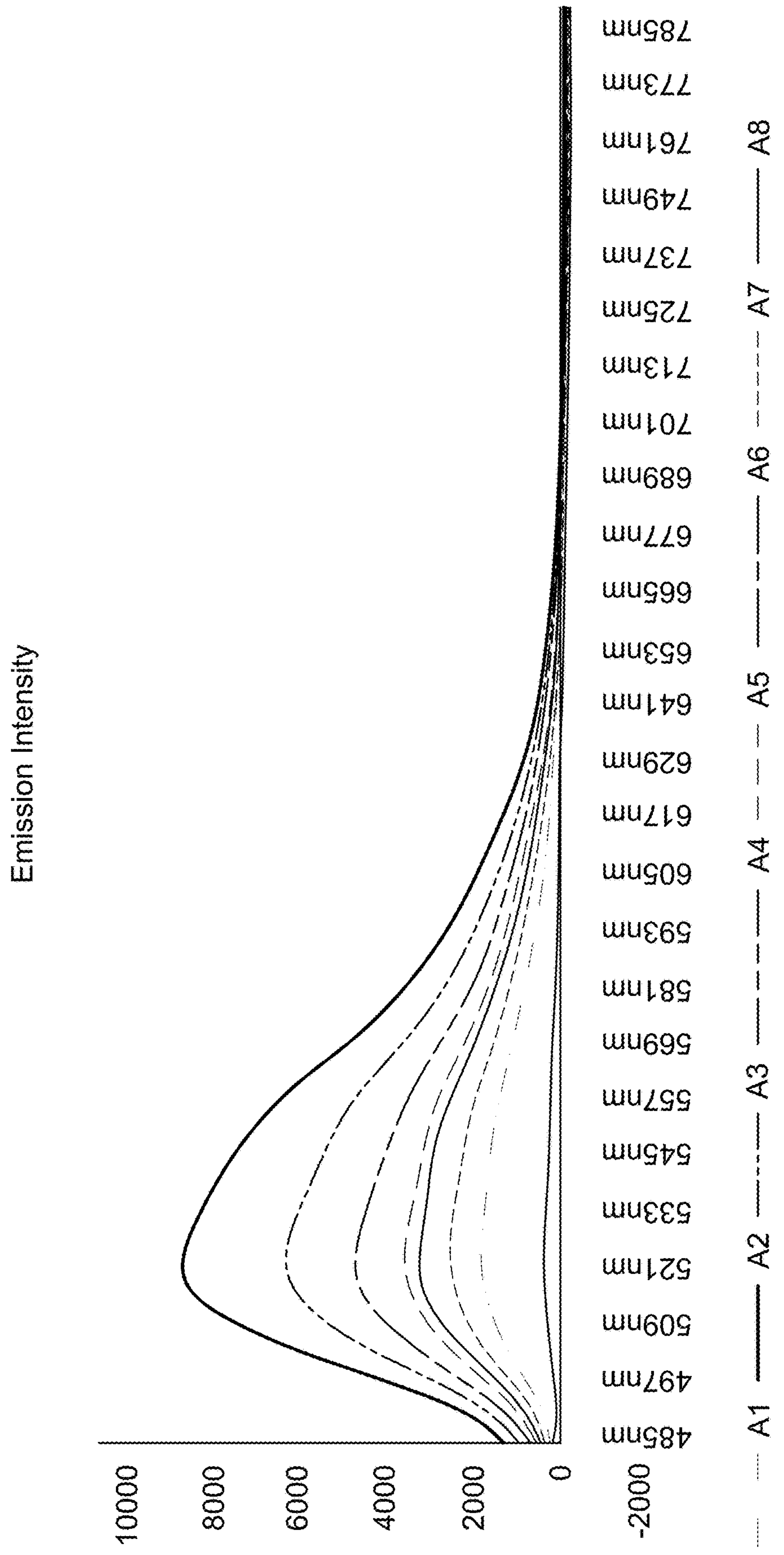
FIG. 2A shows emission measurement of 5-FAM dye at 50 µM concentration with/without morphine. Emission intensity: A1: 5-FAM only (50 µM); A2: Morphine at 1,000 µM: A3: Morphine at 500 µM; A4: Morphine at 250 µM; A5: Morphine at 125 µM; A6: Morphine at 62.5 µM: A7: Morphine at 31.25 µM: A8: Morphine at 15.63 µM.
Figure 2B:
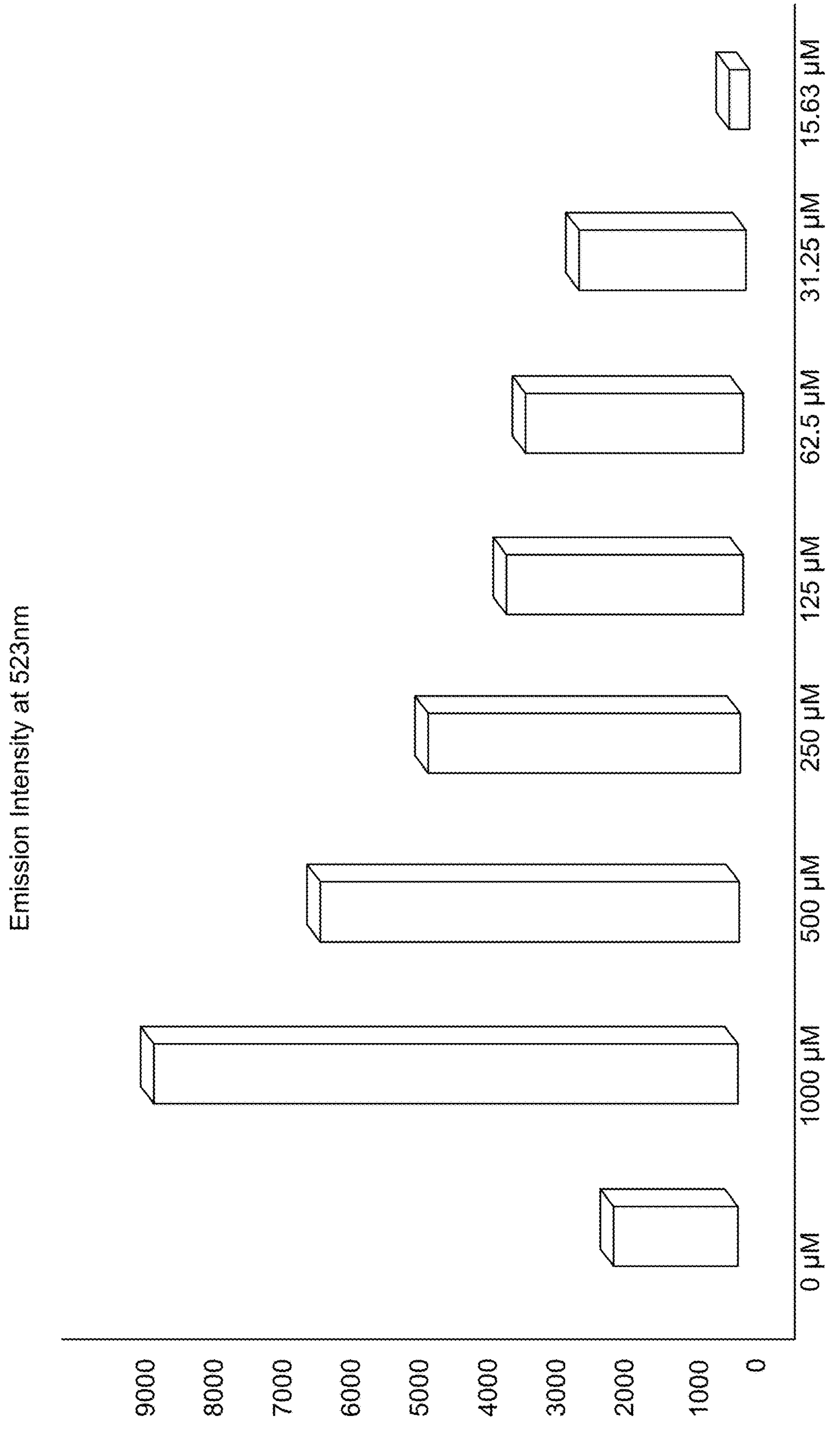
FIG. 2B. Dose response curve of 5-FAM with/without morphine at maximum emission wavelength of 523 nm.
Figure 3A:
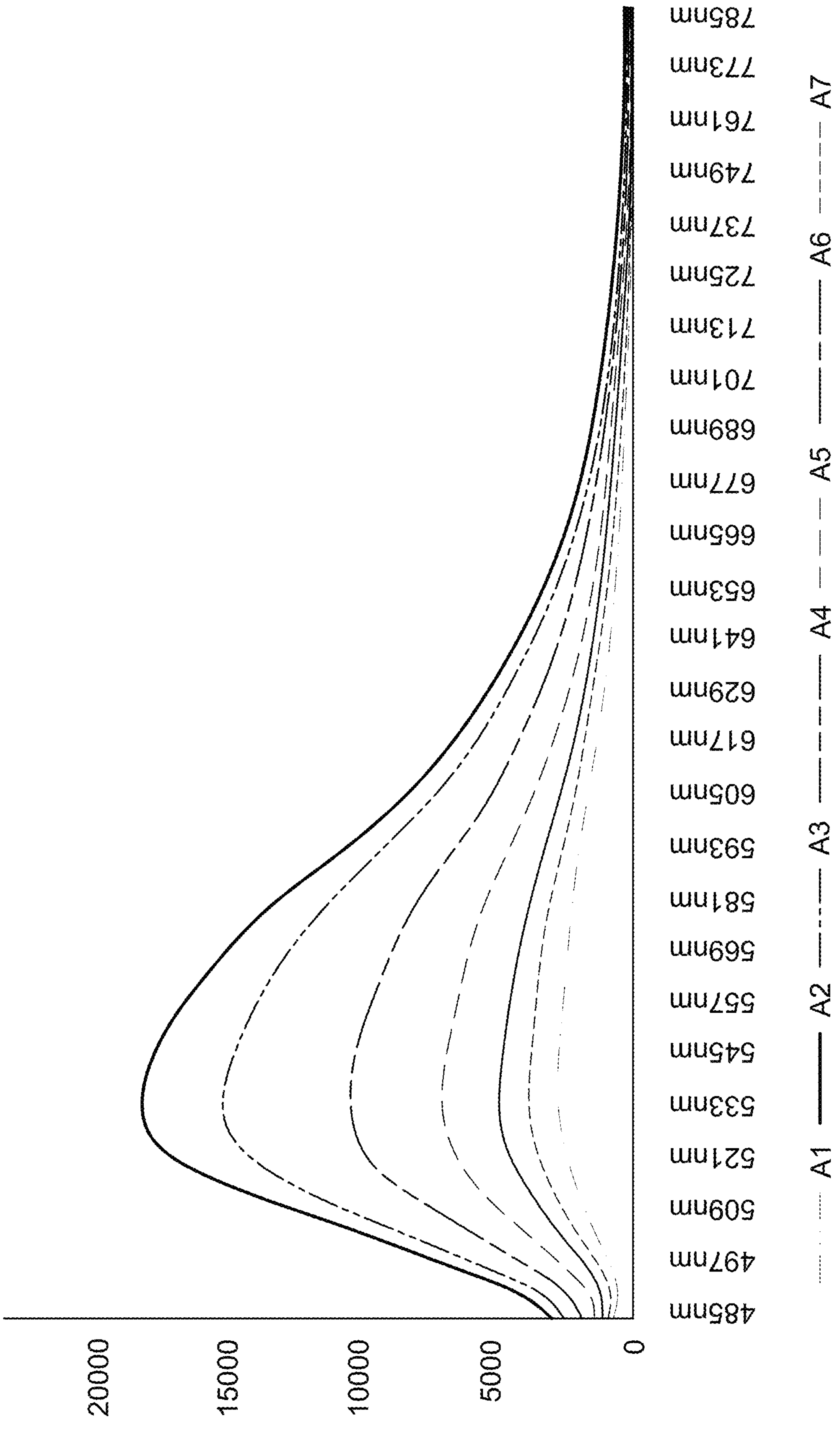
FIG. 3A shows emission measurement of 5-FAM dye at 50 µM concentration with/without cocaine. Emission intensity: A1: 5-FAM only (50 µM); A2: cocaine at 500 µM; A3: cocaine at 250 µM; A4: cocaine at 125 µM; A5: cocaine at 62.5 µM; A6: cocaine at 31.25 µM; A7: cocaine at 15.63 µM.
Figure 3B:
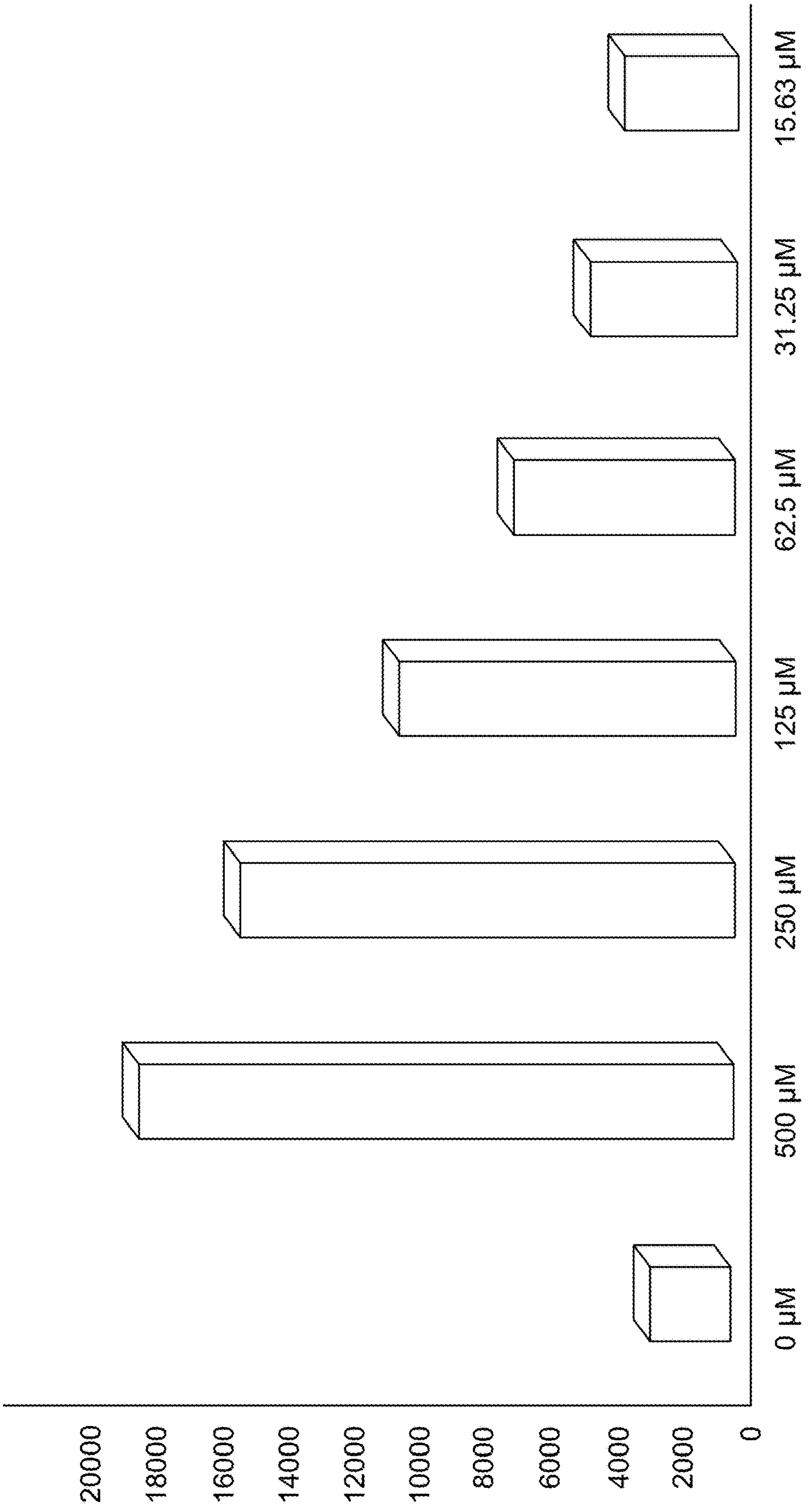
FIG. 3B shows the dose response pattern of 5-FAM with/without cocaine at maximum emission wavelength of 523 nm, respectively.
Figure 4A:
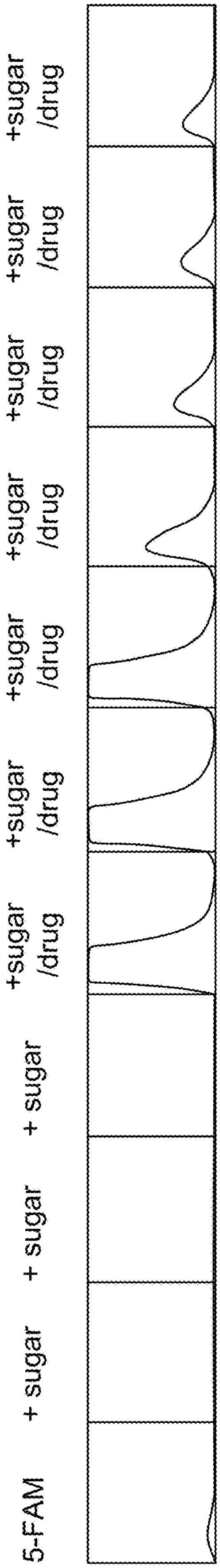
FIGS. 4A and 4B shows emission measurement of interference powdered sugar and fentanyl (10:1 ratio). 5-FAM at 50 µM, 10:1 ratio of sugar and fentanyl with Fentanyl concentration decreased serially from 500 µM to 7.82 µM.
Figure 4B:
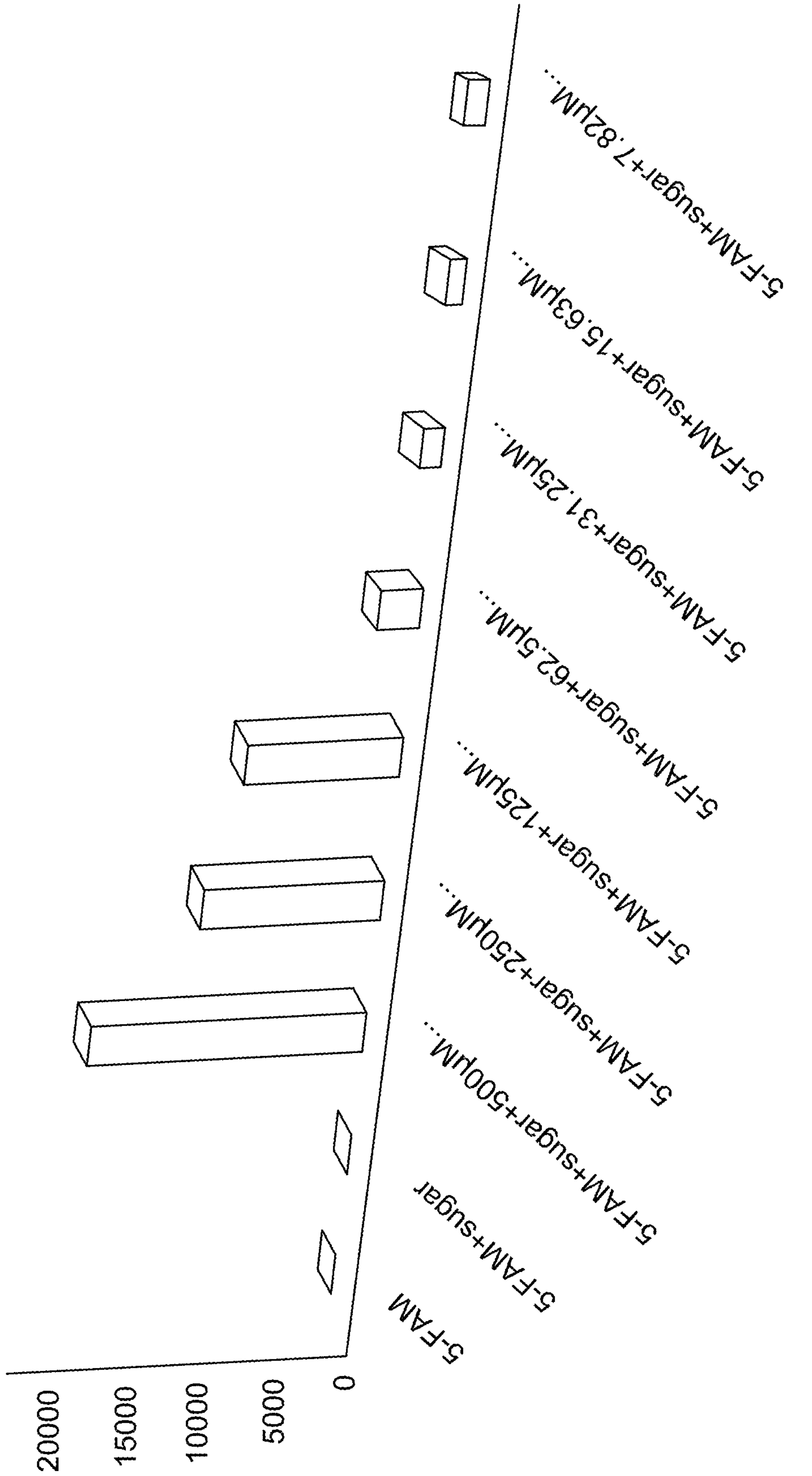
Figure 5A:
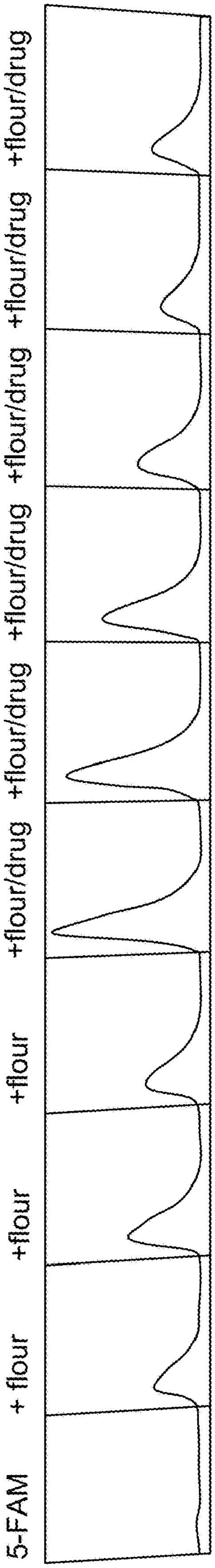
FIGS. 5A and 5B shows emission measurement of interference flour (filtered) and fentanyl (10:1 ratio). 5-FAM at 50 µM, 10:1 ratio of flour (filtered) and fentanyl with Fentanyl concentration decreased serially from 500 µM to 7.82 µM.
Figure 5B:
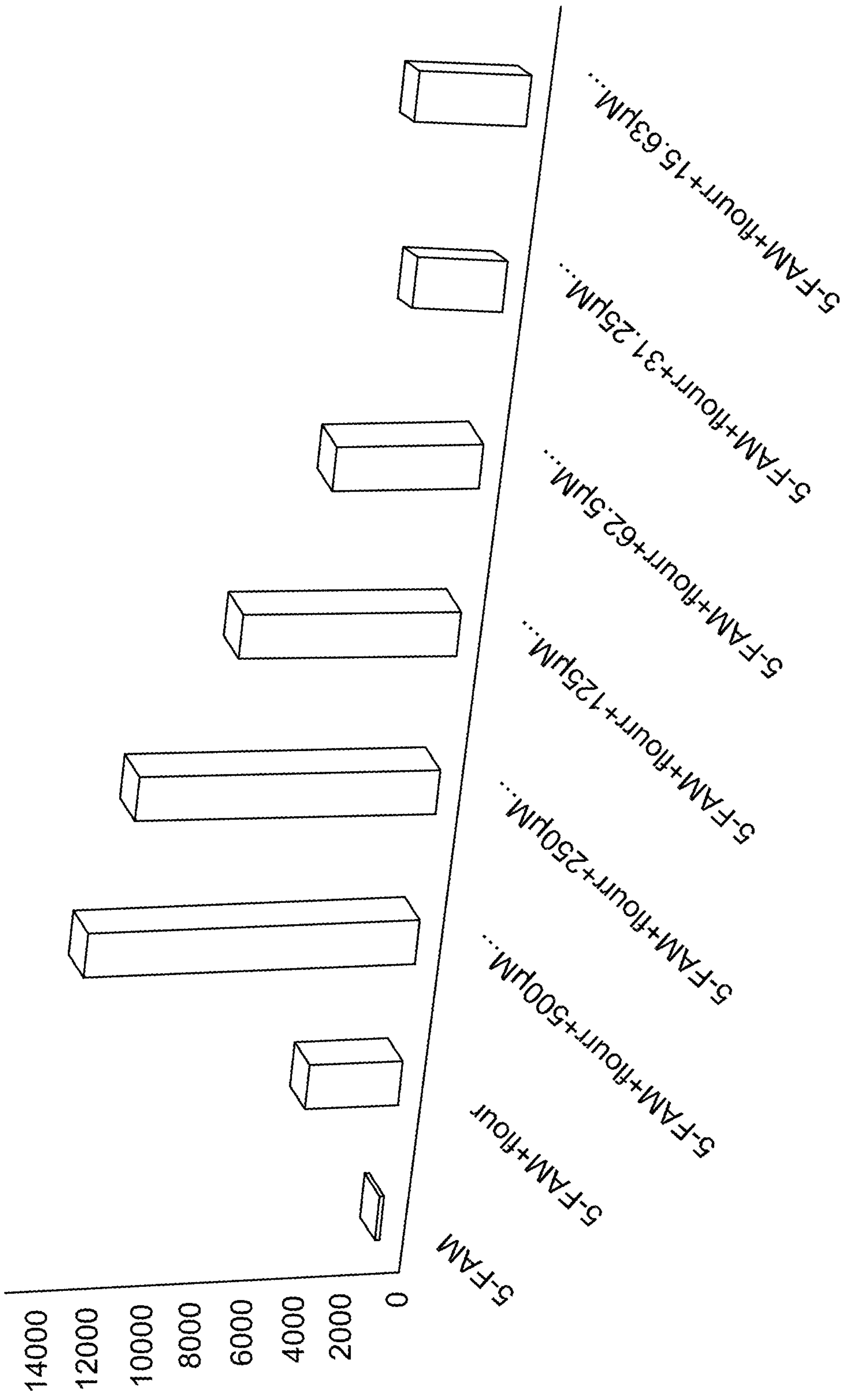
Figure 6:
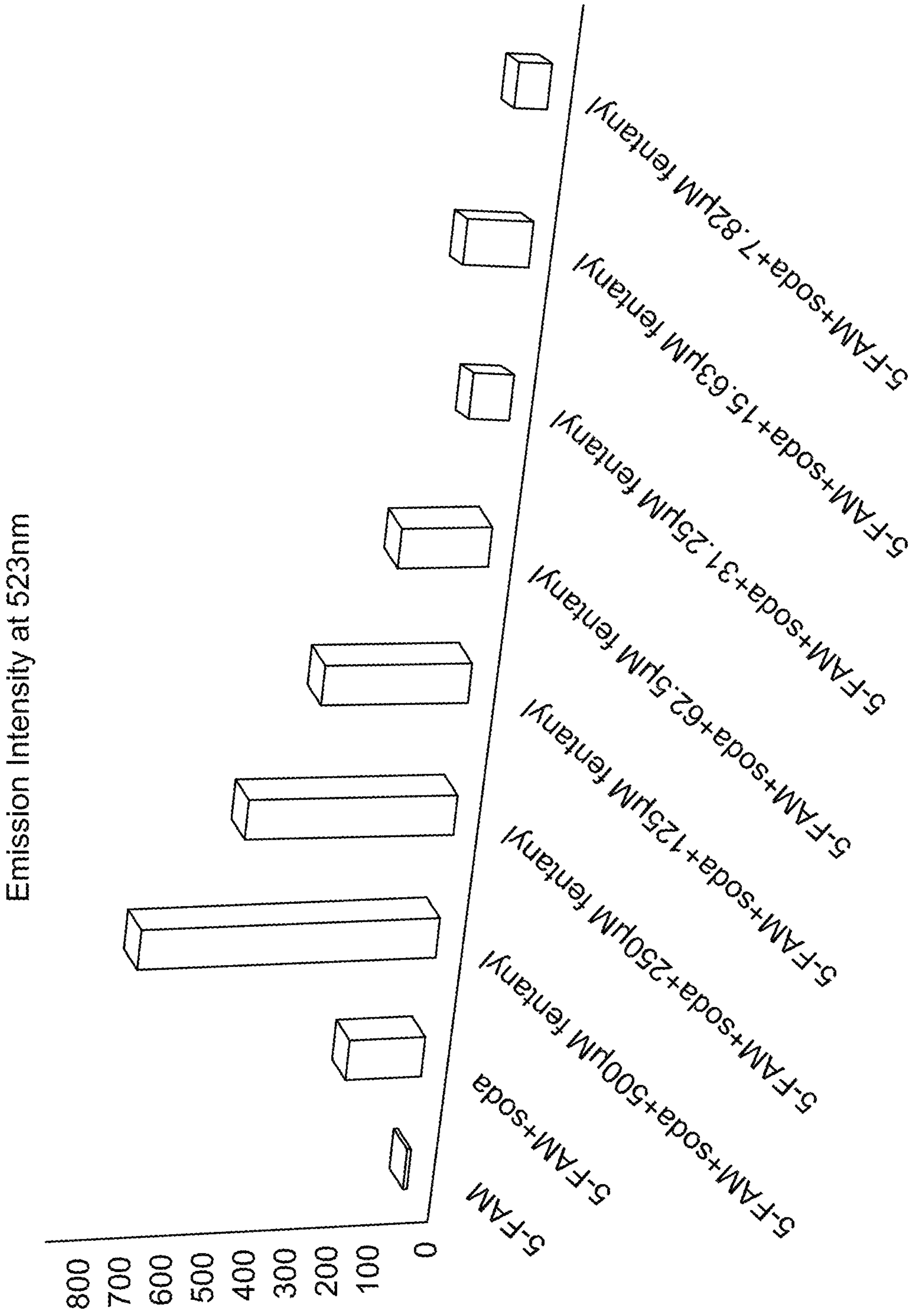
FIG. 6 shows emission measurement of interference baking soda and fentanyl (10:1 ratio). 5-FAM at 50 µM, 10:1 ratio of baking soda and fentanyl with Fentanyl concentration decreased serially from 500 µM to 7.82 µM.
Figure 7A:
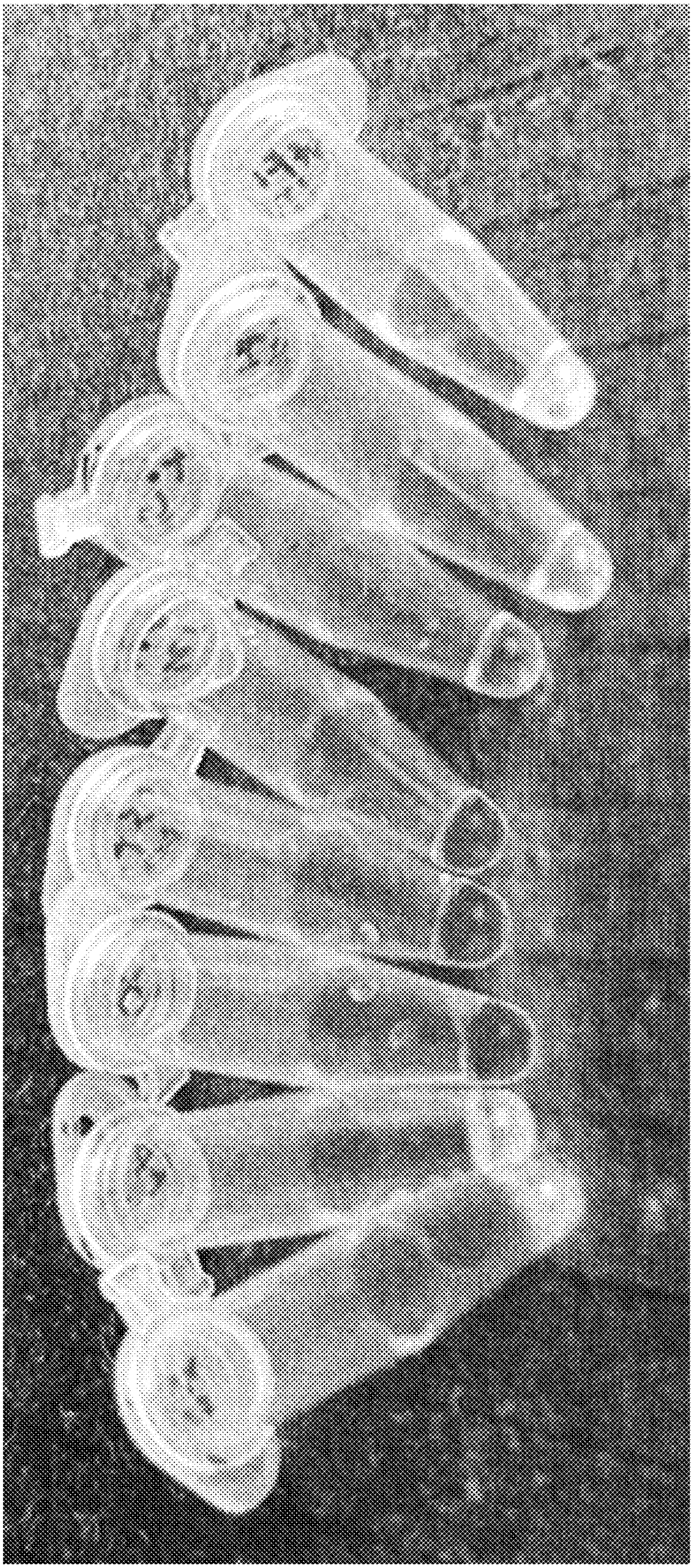
FIG. 7A shows color enhancement in the appearance of the interference powdered sugar is also observed under the different wavelength of the UV light 365 nm. Left to right in figure: dye only; dye+sugar; dye+sugar+fentanyl (500 µM); dye+sugar+fentanyl (250 µM); dye+sugar+fentanyl (125 µM); dye+sugar+fentanyl (62.5 µM); dye+sugar+fentanyl (31.25 µM); dye+sugar+fentanyl (15.63 µM).
Figure 7B:
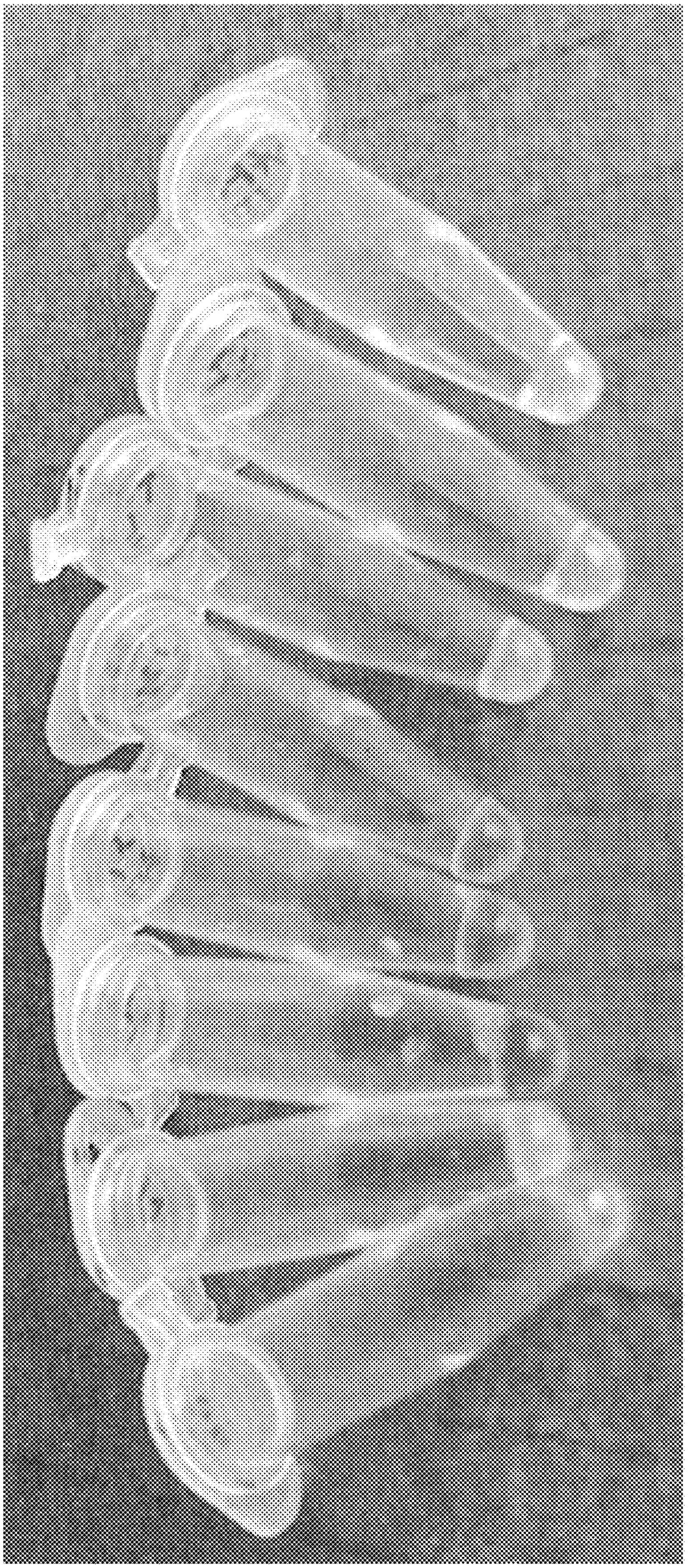
FIG. 7B shows color enhancement in the appearance of the interference powdered sugar is also observed under the different wavelength of the UV light 302 nm. Left to right in figure: dye only; dye+sugar; dye+sugar+fentanyl (500 µM); dye+sugar+fentanyl (250 µM); dye+sugar+fentanyl (125 µM); dye+sugar+fentanyl (62.5 µM); dye+sugar+fentanyl (31.25 µM); dye+sugar+fentanyl (15.63 µM).
Figure 7C:
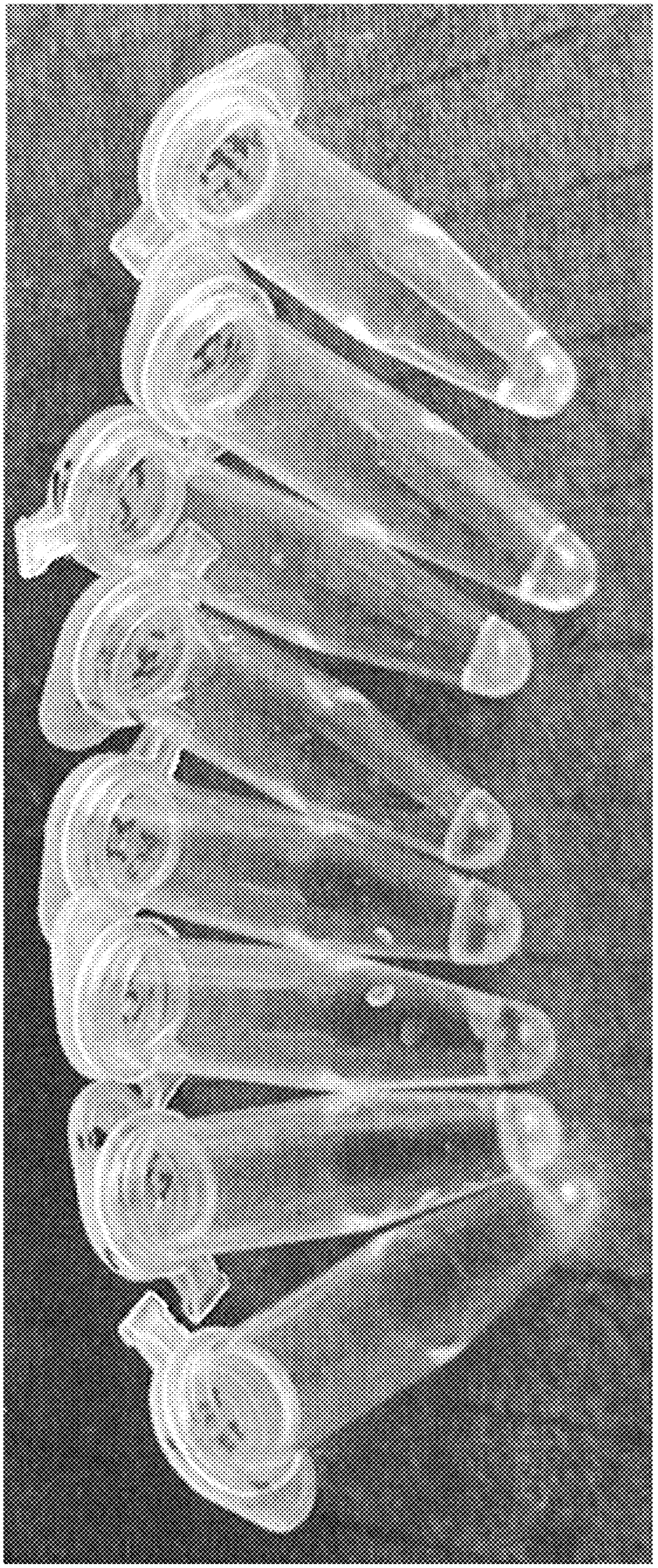
FIG. 7C shows color enhancement in the appearance of the interference powdered sugar is also observed under the different wavelength of the UV light 252 nm. Left to right in figure: dye only; dye+sugar; dye+sugar+fentanyl (500 µM); dye+sugar+fentanyl (250 µM); dye+sugar+fentanyl (125 µM); dye+sugar+fentanyl (62.5 µM); dye+sugar+fentanyl (31.25 µM); dye+sugar+fentanyl (15.63 µM).

FIG. 1A shows emission intensity increase of fentanyl with 5-FAM dye excitation at 450 nm and emission scan from 485 to 785 nm, concentration of fentanyl was tested from 1000 μM (C2) to 15.63 μM (C8) with dye 5-FAM at concentration of 50 μM, compared to 5-FAM (50 μM) only at C1. FIG. 1B demonstrates the dose response pattern of fentanyl with 5-FAM at maximum emission wavelength of 523 nm, respectively.

Example 2

Regarding the possible interferences such as sugar, flower or baking soda etc., we performed the testing by adding these possible interferences using a 10:1 ratio of the interference and drug at 50 μM concentration of 5-FAM. The data showed that these interferences added some noise of 5-FAM, however, when we added fentanyl, the emission intensity is much enhanced, which means we could still detect these opioid substances by deducting the intensity of the interference as background noise (FIG. 4A, 4B, FIG. 5A, 5B, FIG. 6). Due to the basic property of baking soda adding strong reaction to the dye, the sensitivity was decreased at fentanyl concentration of 31.25 μM.

Example 3

Instruments: TECAN_safire2 and Thermo scientific 3UV lamp (252 nm, 302 nm, 365 nm). Material: pyrromethene biodipyl dosium dye (Fw: 466.19), 5-carboxyfluorescein dye (Millipore Sigma, Fw: 373.32), Morphine (1 μg/μL MeOH solution), IN HCl solution, Greiner Bio-one 96-well Flat bottom Chimney style non-binding microplate (Fischer Scientific), Greiner Bio-one 96-well non-treated polystyrene microplates (Fischer Scientific).

Emission testing: Make stock solution of pyrromethene dye at 2 mmol.: weigh 2.0 mg of pyrromethene 556 biodipyl dosium dye (Fw: 466.19), dissolve in milli-Q and adjust the pH value to 3. Final volume 2,145 μL. 2) Make stock solution of 5-carboxyfluorescein dye 2 mmol.: weigh 2.0 mg of 5-carboxyfluorescein dye (Fw: 373.32), dissolve in MeOH. Final volume 2,675 μL. 3) Emission testing: Greiner Bio-One 96-well Flat Bottom Chimney style non-binding microplates, testing volume at 60 μL per well. 3a) Series dilution of pyrromethene 556 dye at dose range: 5 μM, 500 μM, 50 nM and 0.5 nM. Use TECAN_safire2 instrument to find the suitable wavelength without saturation. 3b) Series dilution of 5-carboxyfluorescein dye at dose range: 5 μM, 500 μM, 50 nM and 0.5 nM. Use TECAN_safire2 instrument to find the suitable wavelength without saturation.

Emission testing for morphine at final dose range: 5 μM, 500 μM, 50 nM and 0.5 nM.

Figure 8A:
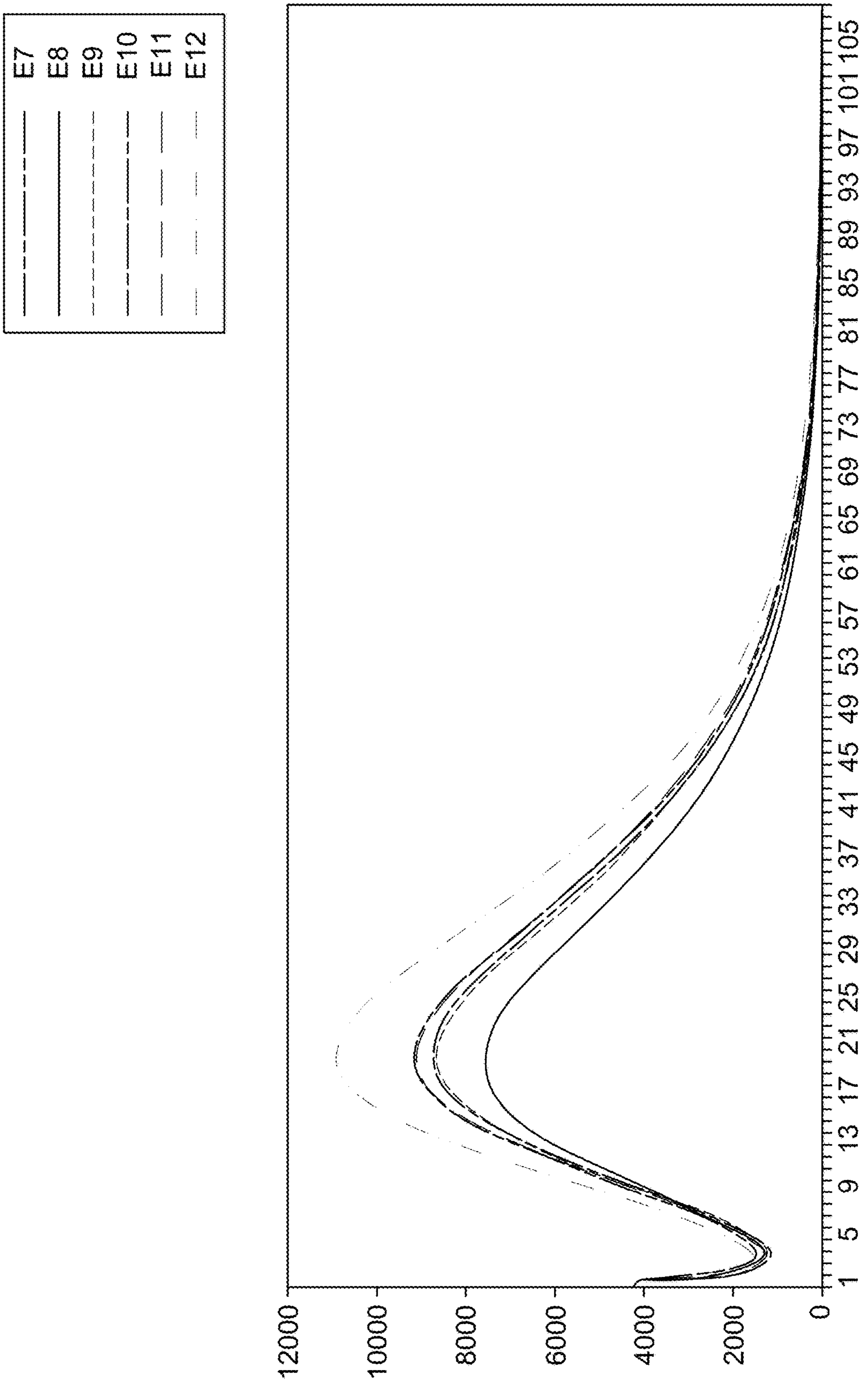
FIG. 8A shows emission spectra of pyrromethene 556 dye and morphine. E12: 60 µL of 500 nM pyrromethene 556 dye (60 µL with 1:1 volume ratio of pH 3 water and MeOH); E7-E11: 30 µL of Morphine at dose range 10 µM, 1 µM, 100 nM and 1 nM mixed with 30 µL of 1 µM of pyrromethene 556 dye in pH 3 water solution, the final concentration of pyrromethene 556 dye is 500 nM and the final concentration of Morphine are 5 µM, 500, 50 nM and 0.5 nM.
Figure 8B:
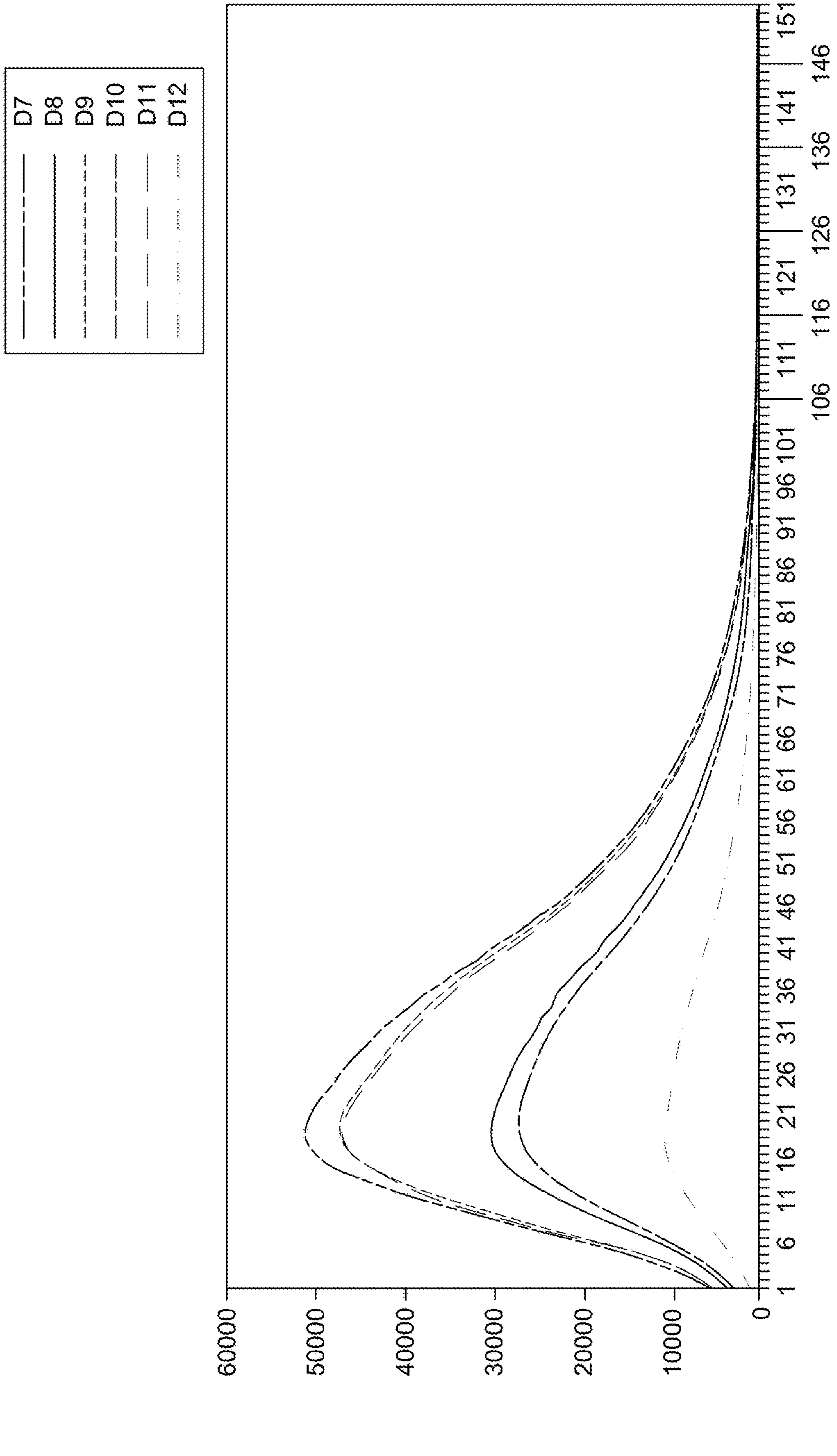
FIG. 8B shows emission spectra of 5-carboxy fluorescein dye and morphine. D12: 60 µL of 500 nM 5-carboxy fluorescein dye in MeOH; D7-D11: 30 μL of Morphine at dose range 10 μM, 1 μM, 100 nM in MeOH and 30 μL of 5-carboxy fluorescein dye in MeOH, the final concentration of 5-carboxy fluorescein dye is 500 nM and the final concentration of Morphine are 5 μM, 500 nM, 50 nM, and 0.5 nM.

Emission spectra: 1) 500 nM concentration was chosen as the suitable concentration for both pyrromethene 556 dye and 5-carboxyfluorescein dye. 2) Emission intensity decrease was observed for pyrromethene 556 dye with morphine at dose dependent behavior (FIG. 8A). 3) Emission intensity increase was observed for 5-carboxyfluorescein dye with morphine at dose dependent behavior (FIG. 8B).

Absorbance Testing: 1) Series dilution of pyrromethene 556 dye at dose range: 100 μM, 50 μM, 25 μM, 12.5 μM and 6.25 μM. Use TECAN_safire2 instrument to find the suitable wavelength without saturation. 3b) Series dilution of 5-carboxyfluorescein dye at dose range: 100 μM, 50 μM, 25 μM, 12.5 μM and 6.25 μM. Use TECAN_safire2 instrument to find the suitable wavelength without saturation.

Figure 8C:
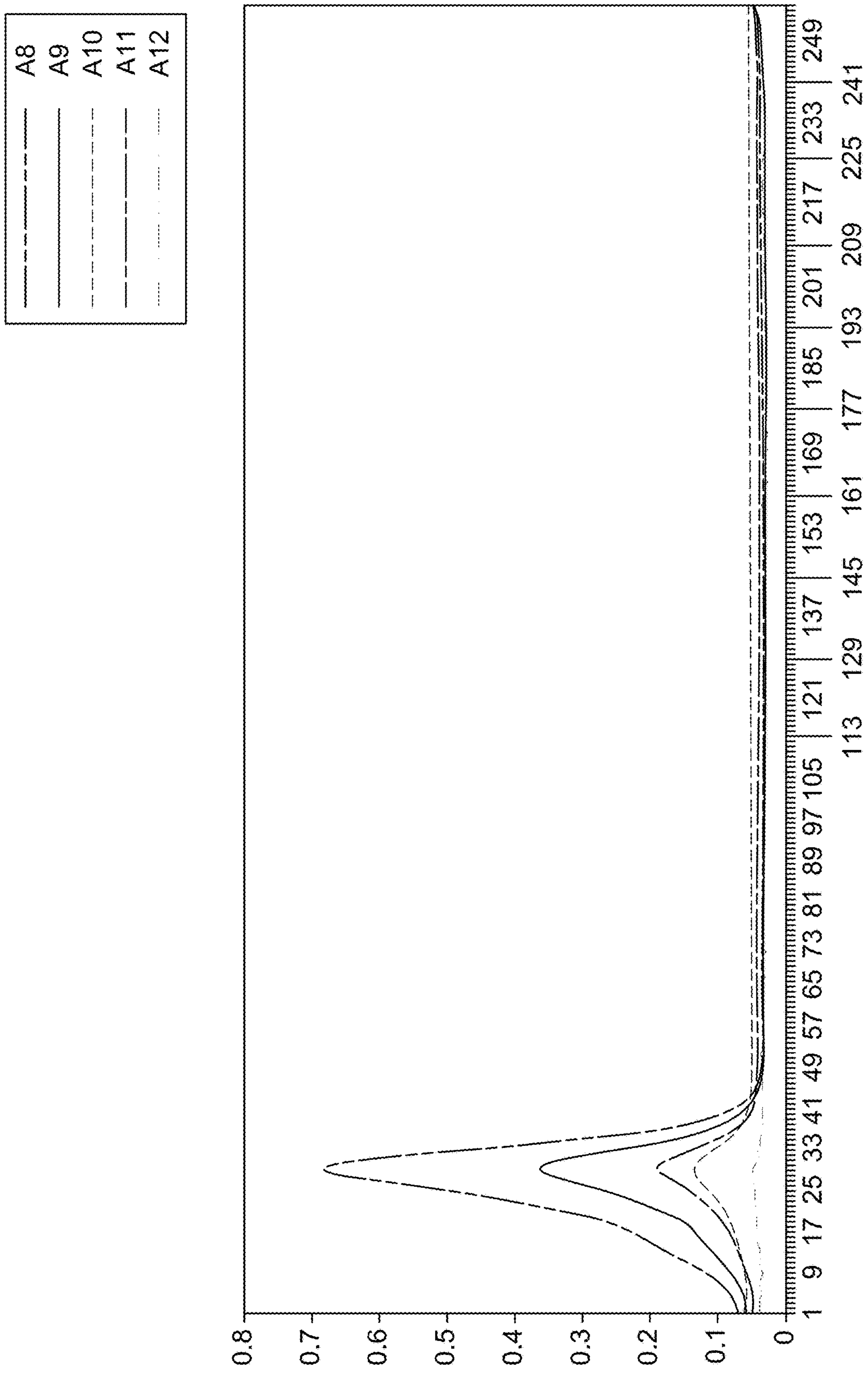
FIG. 8C shows absorbance spectra of pyrromethene 556 dye. A8-A12 with the concentration of pyrromethene 556 dye at 100 μM, 50 μM, 25 μM and 12.5 μM and 6.25 μM.
Figure 8D:
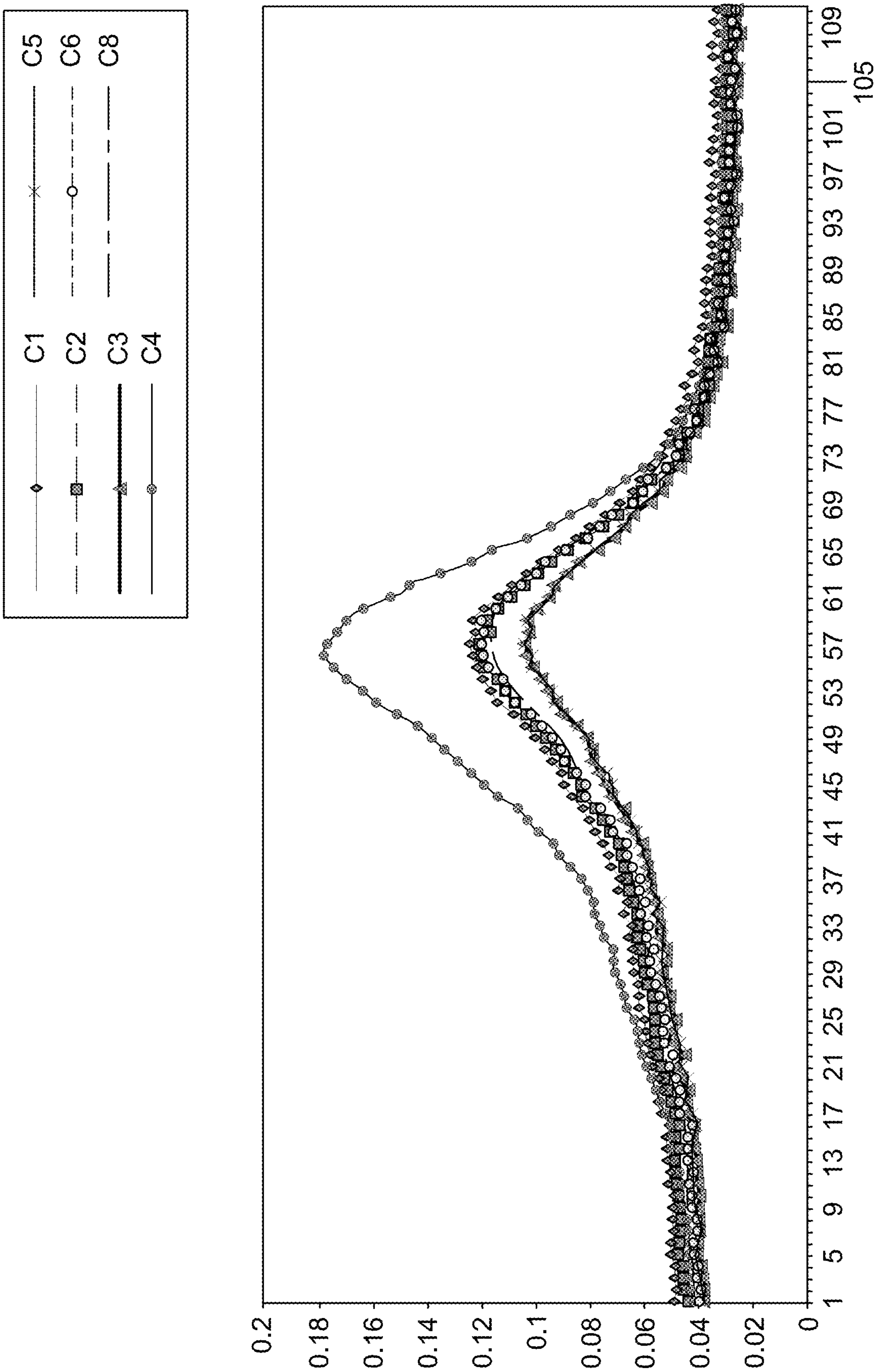
FIG. 8D shows absorbance spectra of pyrromethene 556 dye and morphine. C8: 60 μL of 12.5 μM pyrromethene 556 dye (60 μL with 1:1 volume ratio of pH 3 water and MeOH); C2-C8: 30 μL of Morphine at dose range 10 μM, 1 μM, 100 nM and 1 nM mixed with 30 μL of 25 μM of pyrromethene 556 dye in pH 3 water solution, the final concentration of pyrromethene 556 dye is 500 nM and the final concentration of Morphine are 5 μM, 500 nM, 50 nM and 0.5 .nM.
Figure 8E:
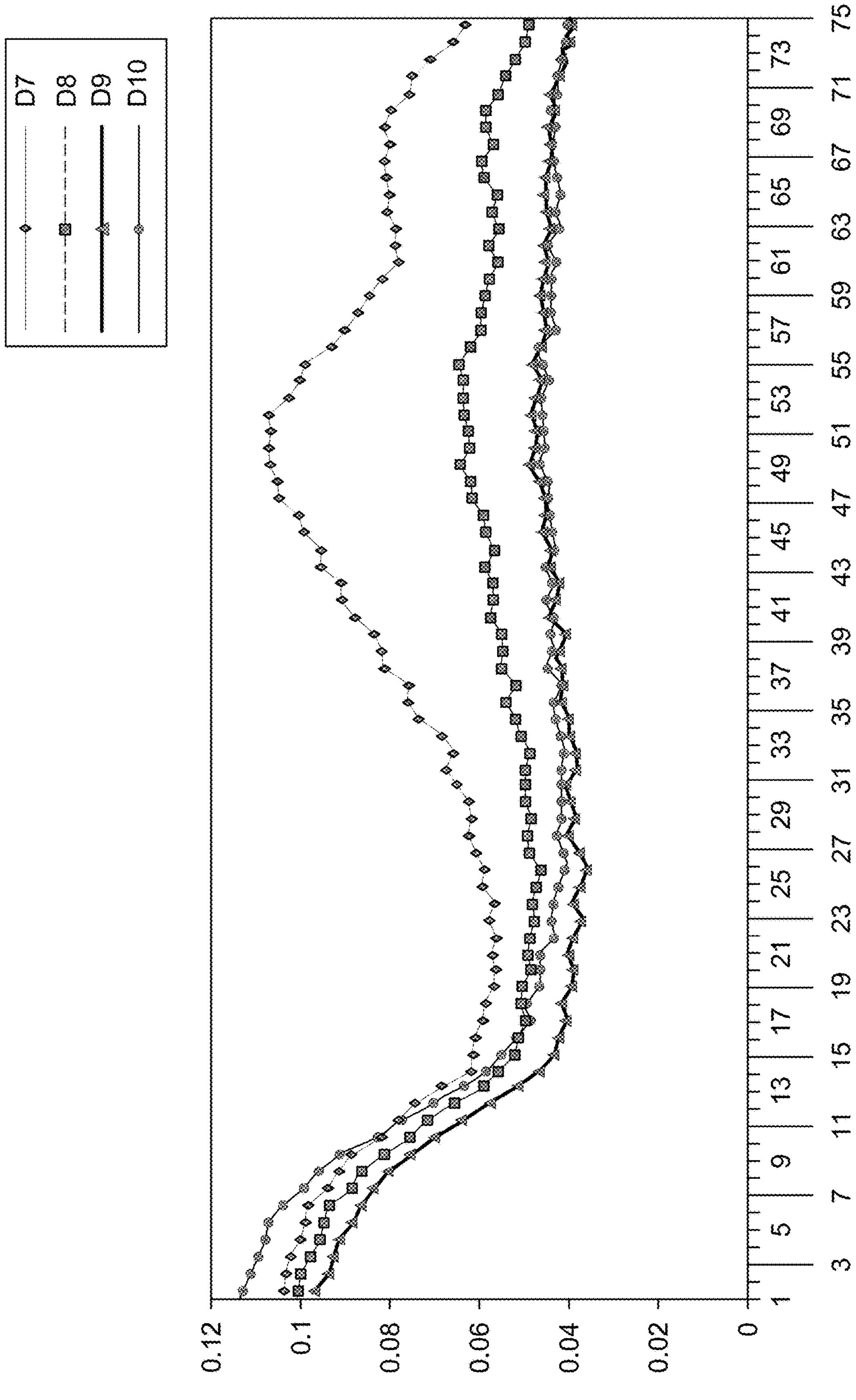
FIG. 8E shows absorbance spectra of 5-carboxy fluorescein dye. D7-D10 with the concentration of 5-carboxy fluorescein dye at 1 mM, 500 μM, 250 μM and 200 μM.

Absorbance spectra: 12.5 μM concentration was chosen as the suitable concentration for both pyrromethene 556 dye (FIG. 8C). 1 mM concentration was chosen as the suitable concentration for 5-carboxyfluorescein dye (FIG. 8D). 1-2 nM wavelength red shift was observed for pyrromethene 556 dye with morphine at dose range from 5 μM to 0.5 nM.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims.

INCORPORATION BY REFERENCE

The disclosures of all patents, patent applications and publications cited herein are hereby incorporated herein by reference, to the extent that they provide procedural or other details consistent with and supplementary to those set forth herein.

What is claimed is:

1. A product comprising a compound of Formula (XXIX), (Formula XXIX)

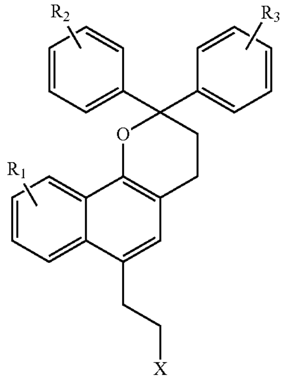

, wherein X is a halogen or a halo group, and $R_1$, R and $R_3$ are selected from H, alkyl, alkoxy, aryl and ester, the compound is configured to react with an opioid compound, wherein the halogen is either bromine or iodine, and wherein the opioid comprises fentanyl, morphine, or cocaine.

2. The product of claim 1, wherein the compound is colorless in a visible light having wavelength in a range of about 400 nm to about 700 nm.

3. The product of claim 1, wherein the compound is a photochromic dye.

4. The product of claim 1, wherein the compound is configured to produce a colour on excitation with a UV radiation having a wavelength in a range of about 100 nm to 450 nm.

5. The product of claim 4, wherein the colour is produced in a dose-dependent manner.

6. The product of claim 4, wherein the compound is configured to convert to a second structure from its first structure on illumination with an excitation signal from the UV radiation.

7. The product of claim 6, wherein an additive is configured to prevent reversing of the second structure of the compound to the first structure after removal of the excitation signal.

8. The product of claim 4, wherein the second structure is configured to revert to the first structure on exposure of a visible light.

9. The product of claim 4, wherein the second structure is configured to revert to the first structure on exposure of a UV light.

10. The product of claim 4, wherein the second structure is configured to revert to the first structure on exposure of a thermal relaxation process.

11. The product of claim 1, wherein the product further comprises an additive.

12. The product of claim 11, wherein the additive enhances sensitivity of a reaction between the opioid compound and the compound.

13. The product of claim 11, wherein the additive comprises a nucleophilic compound.

14. The product of claim 11, wherein the additive comprises an electrophilic compound.

15. The product of claim 1, configured to detect at least about 0.25 nM of the opioid compound in a sample.

16. The product of claim 1, wherein the compound is configured to undergo nucleophilic substitution with a piperidine derivative of an opioid compound.

* * * * *